United States Patent
Culvey et al.

(10) Patent No.: US 6,841,058 B2
(45) Date of Patent: Jan. 11, 2005

(54) REDOX BIPOLAR CELL FABRIC WASHER SYSTEM

(76) Inventors: Brian G. Culvey, 7867 Oak Way, Sedalia, CO (US) 80135; Kim Bong Jun, 172 Buncheon-Ri, Hajang-Myun, Sam Cheok City, Kang Won-Do 235-912 (KR)

( * ) Notice: Subject to any disclaimer, the term of this patent is extended or adjusted under 35 U.S.C. 154(b) by 489 days.

(21) Appl. No.: 10/063,262

(22) Filed: Apr. 4, 2002

(65) Prior Publication Data

US 2003/0188976 A1 Oct. 9, 2003

(51) Int. Cl.[7] .......................... C02F 1/461; C02F 1/463
(52) U.S. Cl. ..................... 205/690; 205/693; 205/700; 205/742; 205/756; 204/228.6; 204/255; 204/256
(58) Field of Search ................................. 205/690, 693, 205/700, 742, 756; 204/228.6, 255, 256

(56) References Cited

U.S. PATENT DOCUMENTS 5,795,459 A   8/1998  Sweeney ................... 205/701
5,928,490 A   7/1999  Sweeney ................... 205/700
6,132,572 A  10/2000  Kim ......................... 204/253

FOREIGN PATENT DOCUMENTS

EP          1036874    *   9/2000

* cited by examiner

Primary Examiner—Arun S. Phasge
(74) Attorney, Agent, or Firm—Roger A. Jackson

(57) ABSTRACT

A redox bipolar cell fabric washing system and method is disclosed that provides for washing fabrics without the use of any added detergents, fabric softeners, or bleaches, or other chemical al additives. The system includes a conventional fabric washing machine with a redox bipolar cell that through a circulation pump continuously treats the wash water by using mixed oxidants or charged wash water to remove contaminants from the fabric. The redox cell includes a housing, a plurality of cathode plates, a plurality of membranes, and a plurality of anodes proximately positioned in an alternate manner with a plurality of flow channels in the housing. The cell produces charged wash water by an electrochemical reaction utilizing electrically charged anodes and cathodes with semi permeable membranes, wherein the oxidation reduction potential of the charged wash water is continuously controlled with a sensor to determine when the fabrics are clean.

23 Claims, 35 Drawing Sheets

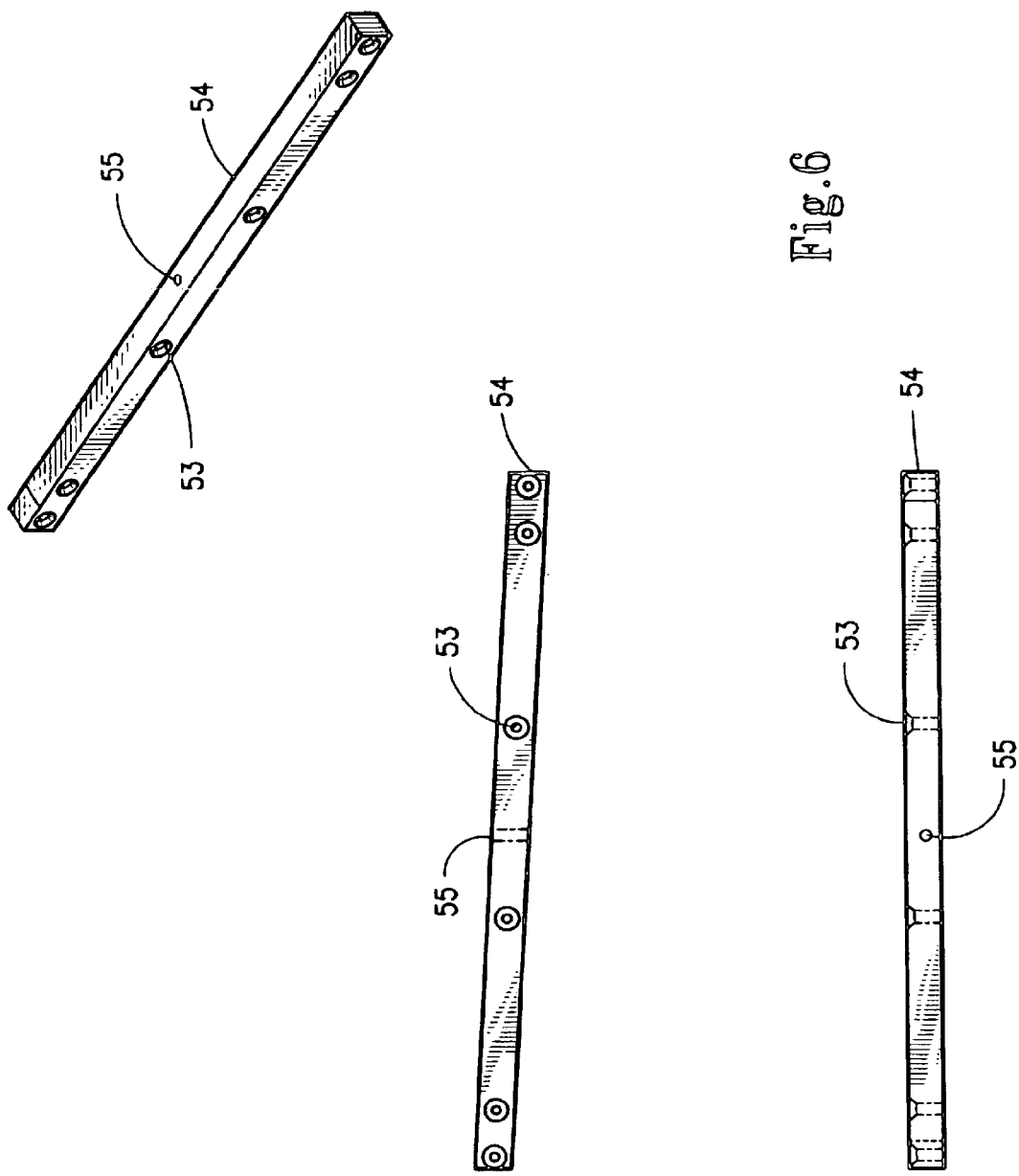
Fig. 6

REDOX BIPOLAR CELL FABRIC WASHER SYSTEM

TECHNICAL FIELD

The present invention relates, in general, to a system for washing fabrics without the use of detergents, and more particularly to an apparatus and method of producing treated water by the use of an electrochemical process for use in a conventional washing machine, wherein the treated water absorbs the dirt, organic contaminants, and other debris from the soiled fabric. The treated water utilizes a redox bipolar cell to create charged water that includes mixed oxidants to clean the fabrics.

BACKGROUND OF INVENTION

Fabric washing is old in the art and utilizes a variety of devices and methods to clean fabrics, these include going from the primitive technologies of beating or pounding the fabrics on hard surfaces using a natural water flow such as a river for fabric washing, to hand washing in a tub, and on to the typical current device and method of using a washing machine that requires a water supply, detergent, wastewater drain, and electrical power. The current basic fabric washing machine typically includes a housing that contains a washing tub wherein the washing tub of holds a basket and an oscillating agitator. The washing machine also includes a hot and a cold water feed connection, a wastewater discharge connection, and an electrical power supply. The method of cleaning fabrics in the washing machine includes a fill cycle wherein various temperatures of water are introduced into the tub that is full of soiled fabrics with the addition of detergent until the tub is full of water. The next cycle is the cleaning cycle wherein the agitator circulates the water and the detergent through the soiled fabrics; subsequently the wastewater is pumped out of the tub to the wastewater discharge connection. Next, there is typically the spin cycle that removes excess water from the fabrics by centrifugal force from the tub rotating and that a repeat of the fill cycle with water not having detergent is for the purpose of rinsing the fabrics of residual soils and detergent, again the agitator is used to circulate the rinse water through the fabric. As in the wash cycle, again the wastewater is pumped out of the tub to the wastewater discharge connection and another spin cycle is completed that again removes excess water from the fabrics. At this point there are a number of optional other cycles that can be added to the basic fabric washing machine cycle above mentioned for specific types of fabrics or dirt levels, such as presoak cycles, additional rinse cycles, cycle time adjustment, and varying the temperature of the water in a tub for both the wash and spin cycles. The control of these various steps in washing fabrics is accomplished by the use of timers, electrically controlled water valves, and various other switches and sensors that are controlled by an a preprogrammed controller wherein the user selects a number of different cycle sequences depending upon the type of fabric and how soiled the fabric is.

Current fabric washing technology while performing an adequate job still has room for improvement, as there are a number of drawbacks to the typical washing machine process. The first problem is one of the amount of time that the current washing machine process takes, with an average of 60 to 90 minutes to complete, in addition the soiled fabrics are not thoroughly clean. Currently the washed fabrics contain approximately 2% of the initial detergent that remains entrained within the fabric as well as 2 to 5% of the original dirt remains in the washed fabric. Also, an excessive amount of water is required for the current entire washing process as approximately 60 to 180 liters or 15 to 45 gallons of water used for the entire cleaning process that is a one-tub load of soiled fabrics. In addition, due to the long washing time and large amount of water used an excessive amount of electrical power is consumed. There are numerous other problems related to current washing technology that stem from the use of detergent, first there's the cost of the detergent itself, second there are the byproducts of the detergent such as phosphates that are in the wastewater that are released into the environment, third detergent's hasten breakdown of fabric structure which results in a shorter life of the fabric wherein the fabric deteriorates with each wash, and due to the residual detergent in the fabrics there can be allergic reactions to individual persons wearing these fabrics that have sensitive skin. Also, fabric softeners are added to the wash water to alleviate the undesirable effects of the residual detergent left behind in the washed fabric that further add to costs and environmental pollutants. Another current fabric washing method being dry cleaning typically uses Stoddard solvent as the washing medium that has the attendant problems of fabric break down, environmental pollution, and flammability.

Prior art solutions toward improving the apparatus and method of washing fabrics have focused on developing an apparatus that can produce treated water with an elevated oxidation reduction potential of the treated water, wherein detergent is not required in the treated water for the washing of fabrics, thereby eliminating the previously identified drawbacks related to using detergent in wash water for fabrics. Several prior art devices attempt to condition or treat standard water supplies by increasing the waters oxidation-reduction potential. The oxidation-reduction potential of standard tap water is in the range of 200 millivolts to 250 millivolts and needs to be treated to increase the oxidation-reduction potential to approximately 650 and higher. The theory is that this treated water will attract contaminants from the fabric being washed into suspension in the wash water wherein the contaminants are removed and the fabrics are washed without the use of adding a detergent to the fabric wash water, the benefit being eliminating all the attendant aforementioned drawbacks of having to use detergent. Also, hot water is not required, thus resulting in further energy savings. Some prior art processes have used ozone which is a gas at room temperature by adding ozone to water resulting in an oxidizing agent allowing the washing of fabrics in water without detergent, however, maintaining the stability over time of the ozone content in the water has proven difficult, which has led to increased use of utilizing electrolytically produced oxidants in the wash water.

One such apparatus is disclosed in U.S. Pat. No. 6,132,572 to Kim that uses an electrolyzer apparatus that includes anode and cathode units that are alternately arranged in a sandwich type fashion separated from each other by ion exchange membranes. Two inlet streams of water introduced into the apparatus wherein one water stream is routed through the anode sections and the other water stream is routed through the cathode sections, and resulting in two treated water outlet streams, with the anode stream being highly acidic and the cathode stream being highly alkaline that cumulates in an elevated oxidation reduction electric potential ranging from −900 to +1180. The Kim device has several drawbacks, namely requiring a variable thickness spacer between the anode and cathode unit cells to optimize performance, has a consumable catalyst on the anode and cathode, and requires the addition of salt and vinegar being used as an electrolyte to enhance the electrical conductivity of the electrolyzer allowing lower voltages to be used. Also, the Kim device fails to disclose either an apparatus or method for utilizing the electrolyzer apparatus in conjunction with a fabric washing machine dealing specifically with the fluid interaction and cycles that would be required to use the electrolyzer for the washing of fabrics.

Another device in this area is disclosed in U.S. Pat. No. 5,928,490 to Sweeney which describes a closed loop large scale commercial laundry treatment system including a washing machine, a filtered wastewater holding tank, and a make up water tank containing an electrolytic cell that produces mixed oxidants that are dissolved in the make up water for use in the washing process that will oxidize deleterious components from the fabric being washed. The electrolytic cell includes three adjacent circumferential bands that are the cathode, membrane, and anode respectively that are in a cylindrical housing that is immersed in a larger tank that contains the make up water. Pumps circulate the water over the cell and introduce air bubbles to increase the efficiency of the process and transfer treated water to the washing machine, where the treated water has an oxidation-reduction electric potential of about 800. This is a batch type system wherein the make up tank water is treated with salt being added for increased electrical conductance. Drawbacks of Sweeney are that it is only a recycle system designed specifically for large commercial washers with the make up tank containing 55 gallons and requires measured amounts of salt depend upon the condition of the makeup tank water and takes 30 minutes to reach full oxidation strength at which time the fabric washing machine is inoperable.

What is needed is a washing machine designed for individual consumer use occupying the same physical size envelope as a conventional washing machine that can take advantage of the oxidation-reduction cleaning technology. This would require a small but efficient oxidation reduction cell that is self contained and controlled that functions as a continuous process device to maintain an optimum oxidation reduction potential of the water during the washing cycle. This would enable the individual consumer to have all the benefits of this technology by eliminating the use of detergent, sanitizing the washed fabrics, extending fabric life, reducing environmental pollutants, reducing wash time, reducing the water consumed, reducing the electrical power consumed, lessening the chance of allergic reactions to residual detergents in fabrics, and better cleaning of the washed fabrics by having a much reduced residual soil left in the fabric.

SUMMARY OF INVENTION

It is an object of the present invention to provide a new and useful fabric washing machine that provides for the efficient and effective washing fabrics without the use of detergents.

It is another object of the present invention to provide for longer fabric life from reduced fabric deterioration due to washing.

It is a further object of the present invention to reduce the amount of environmental pollutants in the wastewater from the washing machine.

Still another object of the present invention is to consume less water during the entire fabric washing process.

Yet another object of the present invention is to reduce the potential for an allergic reaction by an individual with sensitive skin wearing the washed fabrics by removing the presence of residual detergent.

It is still another object of the present invention to reduce the amount of time and required to complete the entire fabric washing process.

Yet still another object of the present invention is to reduce the amount of residual soil left in the fabric after washing.

It is further yet another object to the present invention to reduce the amount of electrical power consumed for the entire fabric washing process.

It is further another object of the present invention to reduce the long-term economic cost of the entire washing process.

Yet a further object of the present invention is to reduce the use of ancillary washing products such as fabric softeners and bleach.

Yet further still another object of the present invention is to sanitize the washed fabrics reducing bacteria and virus from the fabrics.

Still yet another object of the present invention is to preclude the requirement of hot and warm water in the fabric washing process.

Another benefit is the addition of oxygen-enriched water to the wastewater, supplementing the standard wastewater treatment system process.

The present invention is a redox bipolar cell in a fabric washing machine utilizing tap water with a low oxidation reduction potential and producing charged wash water by an electrochemical reaction to elevate the oxidation reduction potential of the wash water to remove contaminants from soiled fabrics forming charged waste water, without the use of a detergent. The redox bipolar cell includes a housing, that has an inlet aperture for the tap water or the charged recycled wash water, an outlet aperture for the charged wash water, an inlet opening for the tap water to form an electrolyte, an outlet opening for a hydrogen rich electrolyte, and a plurality of electrical connections. The redox bipolar cell also includes a plurality of cathodes, ion exchange membranes, and anode plates that are all disposed within the housing, the cathode and anode plates are separated by the membranes. Also a cathode spacer plate is positioned between the cathode plates that are disposed within the housing, the cathode spacer plate forms an electrolyte chamber between the cathode plates, the cathode spacer plate is positioned within the housing to facilitate the tap water or charged waste water to flow over the anode plates.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows side, bottom, end, and perspective views of the anode retainer;

REFERENCE NUMBER IN DRAWINGS

Figure 1:
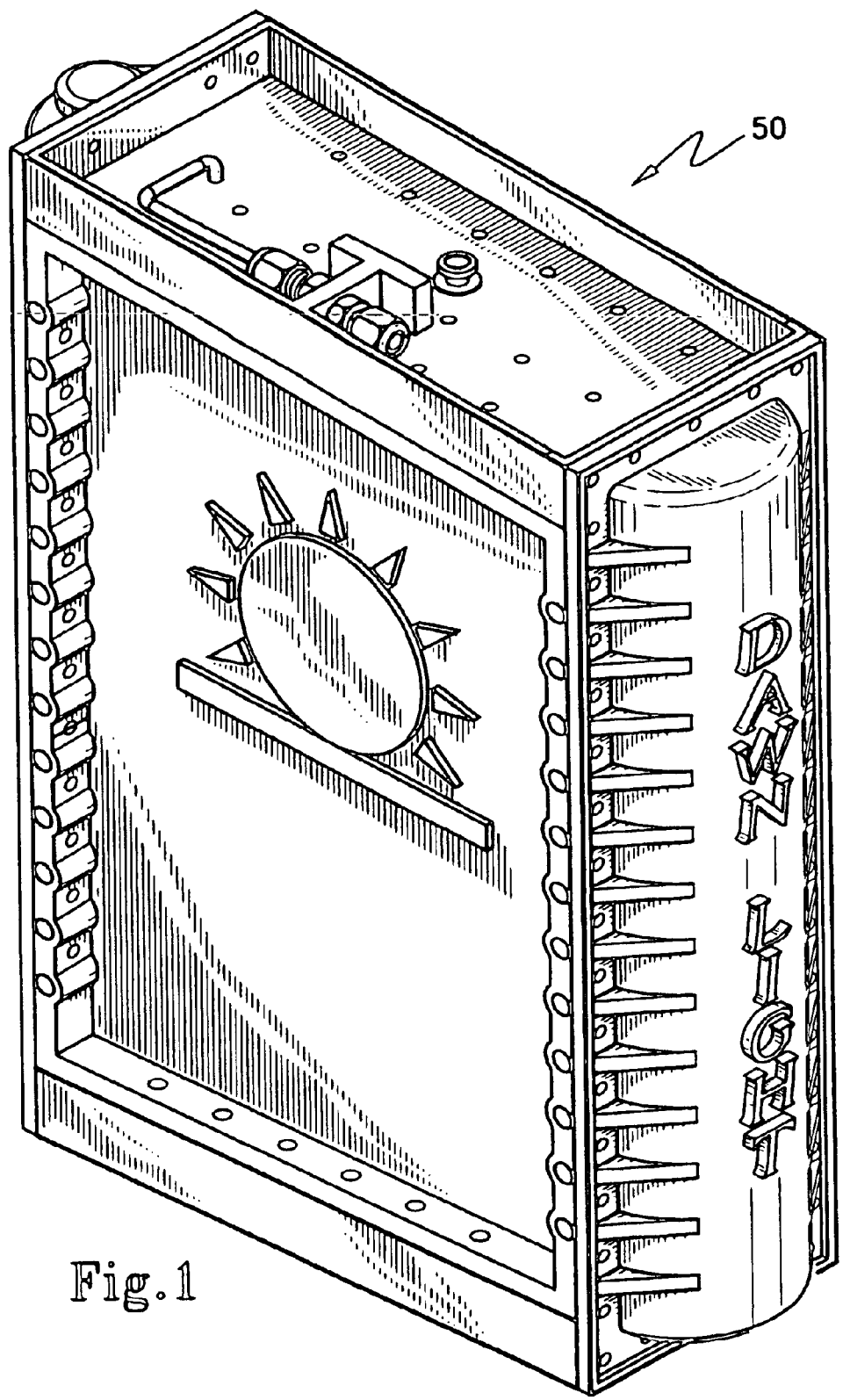
FIG. 1 is a perspective view of the redox bipolar cell assembly.

50 Redox bipolar cell assembly
51 First side of bipolar cell assembly
52 Cover plate first side
53 Aperture for anode retainer fastener
54 Anode retainer
55 Receptacle for anode electrical connector
56 Anode
57 Second side of bipolar cell assembly
58 Membrane
59 Aperture for cap plate to cathode spacer plate fastener
60 Cathode plate first side
61 Aperture for anode retainer to cathode spacer plate fastener
62 Cathode spacer plate
63 Aperture for cathode-to-cathode spacer plate fastener
64 Cap plate
65 Aperture for cathode vent conductor
66 Cathode plate second side
67 Aperture for flow channel to cathode spacer plate fastener
68 Flow channel fourth side
69 Third side of bipolar cell assembly
70 Flow channel third side
71 Fourth side of bipolar cell assembly
72 Cover plate second side
73 Aperture in cap plate for anode electrical connector
74 Cover fourth end
75 Support for tubing connector
76 Cover third end
77 Aperture for cap plate to cathode spacer plate fastener
78 Cathode vent conductor
79 Aperture for cap plate to cover plate fastener
80 Fastener cathode
81 Aperture in cap plate for cathode plate conductor
82 Tubing connector
83 Aperture in cap plate for cover fastener
84 Fastener for anode
85 Aperture for fourth side flow channel to cathode spacer plate fastener
86 Electrical connector for anode
87 Aperture in fourth side flow channel for anode fastener
89 Flow guide plate for fourth side flow channel
90 Aperture for cover plate and fourth side flow channel fastener 91 Flow guide plate for third side flow channel
92 Aperture for cover plate and third side flow channel fastener
93 Aperture for third side flow channel to cathode spacer plate fastener
95 Aperture in third side flow channel for anode fastener
97 Aperture for first side cover plate to flow channel fastener
98 Flow guide for first side cover plate
99 Aperture for first side cover plate to cap plate fastener
101 Aperture for first side cover plate to cap fastener
102 Flow guide for second side cover plate
103 Aperture for second side cover plate to flow channel fastener
105 Aperture for second side cover plate to cap plate fastener
106 Inlet aperture for tap water or charged recycled wash water
107 Aperture for second side cover plate to cover fastener
108 Outlet aperture for charged wash water
109 Flow guide recess in fourth end cover
110 Chamber for electrolyte between cathode plates
111 Aperture for fourth end cover to cover plate fastener
112 Fifth side of bipolar cell assembly
113 Flow guide recess in third end cover
114 Sixth side of bipolar cell assembly
115 Aperture for third end cover to cover plate fastener
116 Inlet aperture for tap water to chamber for electrolyte between cathode plates
117 First end of cathode vent conductor
118 Outlet aperture for hydrogen saturated electrolyte
119 Second end portion of cathode vent conductor
120 Channel flow block plate for tap water or charged recycled wash water inlet aperture
121 Aperture in second end portion of cathode vent conductor
122 Channel flow block plate for charged wash water outlet aperture
123 Aperture for membrane to cathode spacer plate fastener
124 Cathode vent conductor connectors
125 Tap water
126 Charged wash water
127 Channeled flow of charged wash water
128 Hydrogen saturated electrolyte
129 Electrolyte
130 Prior art fabric washing machine assembly
131 Pump and motor for prior art fabric washing machine assembly
132 Waste water discharge for prior art fabric washing machine assembly
133 Solenoid operated control valve manifold for prior art fabric washing machine assembly
134 Tap water inlet for hot water for prior art fabric washing machine assembly
135 Tap water inlet for cold water for prior art fabric washing machine assembly
136 Tub for prior art fabric washing machine assembly
137 Basket for prior art fabric washing machine assembly
138 Agitator for prior art fabric washing machine assembly
139 Agitator motor for prior art fabric washing machine assembly
140 Redox bipolar cell fabric washer assembly
141 Pump and motor for redox bipolar cell fabric washer assembly
142 Wastewater discharge for redox bipolar cell fabric washer assembly
143 Solenoid operated control valve manifold for redox bipolar cell fabric washer assembly
144 Tap water inlet for hot water for redox bipolar cell fabric washer assembly
145 Tap water inlet for cold water for redox bipolar cell fabric washer assembly
146 Tub for redox bipolar cell fabric washer assembly
147 Basket for redox bipolar cell fabric washer assembly
148 Agitator for redox bipolar cell fabric washer assembly
149 Agitator motor for redox bipolar cell fabric washer assembly
150 Redox bipolar cell fabric washer assembly with filter
151 Back flush solenoid valve for redox bipolar cell fabric washer assembly with filter
152 Filter for redox bipolar cell fabric washer assembly with filter
153 Redox bipolar cell fabric washer assembly with filter and electrocoagulation unit 1
154 Electrocoagulation unit
155 Oxidation-reduction potential sensor
156 Differential pressure transducer sensor for filter
157 Cavitation inlet in pump for an air or oxygen
158 Charged water
159 Venturi inlet for air or oxygen
160 Impingement inlet for air or oxygen

DETAILED DESCRIPTION

The present invention is a redox bipolar cell in a fabric washing machine utilizing tap water with a low oxidation reduction potential and producing charged wash water by an electrochemical reaction to elevate the oxidation reduction potential of the wash water to remove contaminants from soiled fabrics forming charged waste water, without the use of a detergent. The redox bipolar cell includes a housing, that has an inlet aperture for the tap water or the charged recycled wash water, an outlet aperture for the charged wash water, an inlet opening for the tap water to form an electrolyte, an outlet opening for a hydrogen rich electrolyte, and a plurality of electrical connections. The redox bipolar cell also includes a plurality of cathodes, ion exchange membranes, and anode plates that are all disposed within the housing, the cathode and anode plates are separated by the membranes. Also a cathode spacer plate is positioned between the cathode plates that are disposed within the housing, the cathode spacer plate forms an electrolyte chamber between the cathode plates, the cathode spacer plate is positioned within the housing to facilitate the tap water or charged recycled wash water to flow over the anode plates.

Figure 2:
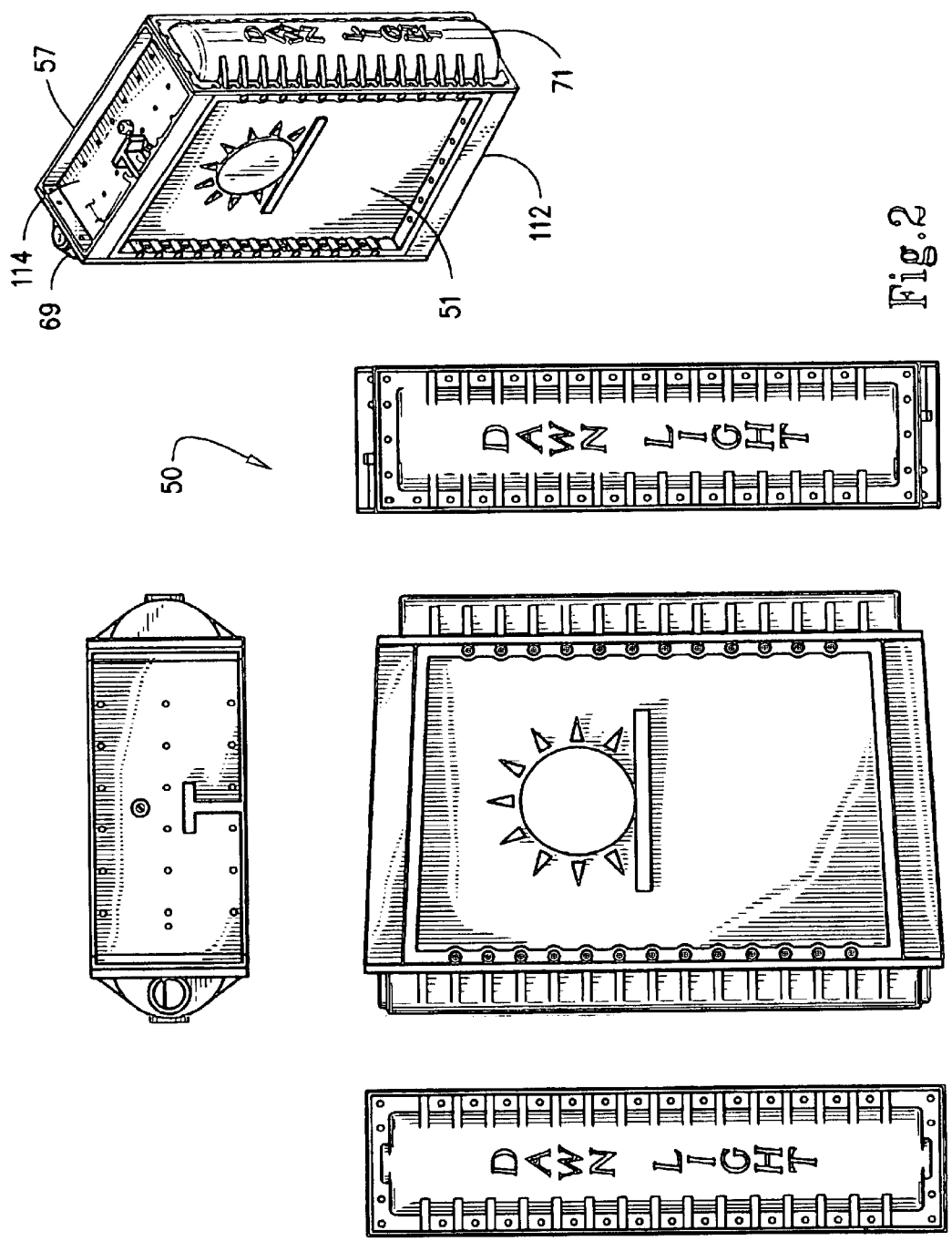
FIG. 2 shows front, both sides, a top, and perspective views of the redox bipolar cell assembly.

With initial reference to FIGS. 1 and 2, perspective, front, top, and side views are shown of the redox bipolar cell assembly 50 in its housing. For proper orientation in this detailed description the various sides are denoted of the redox bipolar cell assembly 50 as follows with specific reference to FIG. 2; a front or the first side of the bipolar cell assembly is denoted as 51, a rear or second side of bi polar cell assembly 57, a left or the third side of the bipolar cell assembly 69, and a right or fourth side of the bipolar cell assembly 71. Additionally, a bottom or fifth side of the bipolar cell assembly 112 is shown along with a top or sixth side of the bipolar cell assembly 114. The redox bipolar cell assembly 50 housing is designed to fit within the volumetric space available in a conventional fabric washing machine. As shown the redox bipolar cell assembly 50 housing is parallelepiped in shape, however, as requirements dictate the housing could assume any number of different configurations to be able to conform to the volumetric space available within a conventional fabric washer machine. These other housing shapes would include cubic, cylindrical, spherical, or any other configurations that would be required for the space available to mount the housing.

Figure 3:
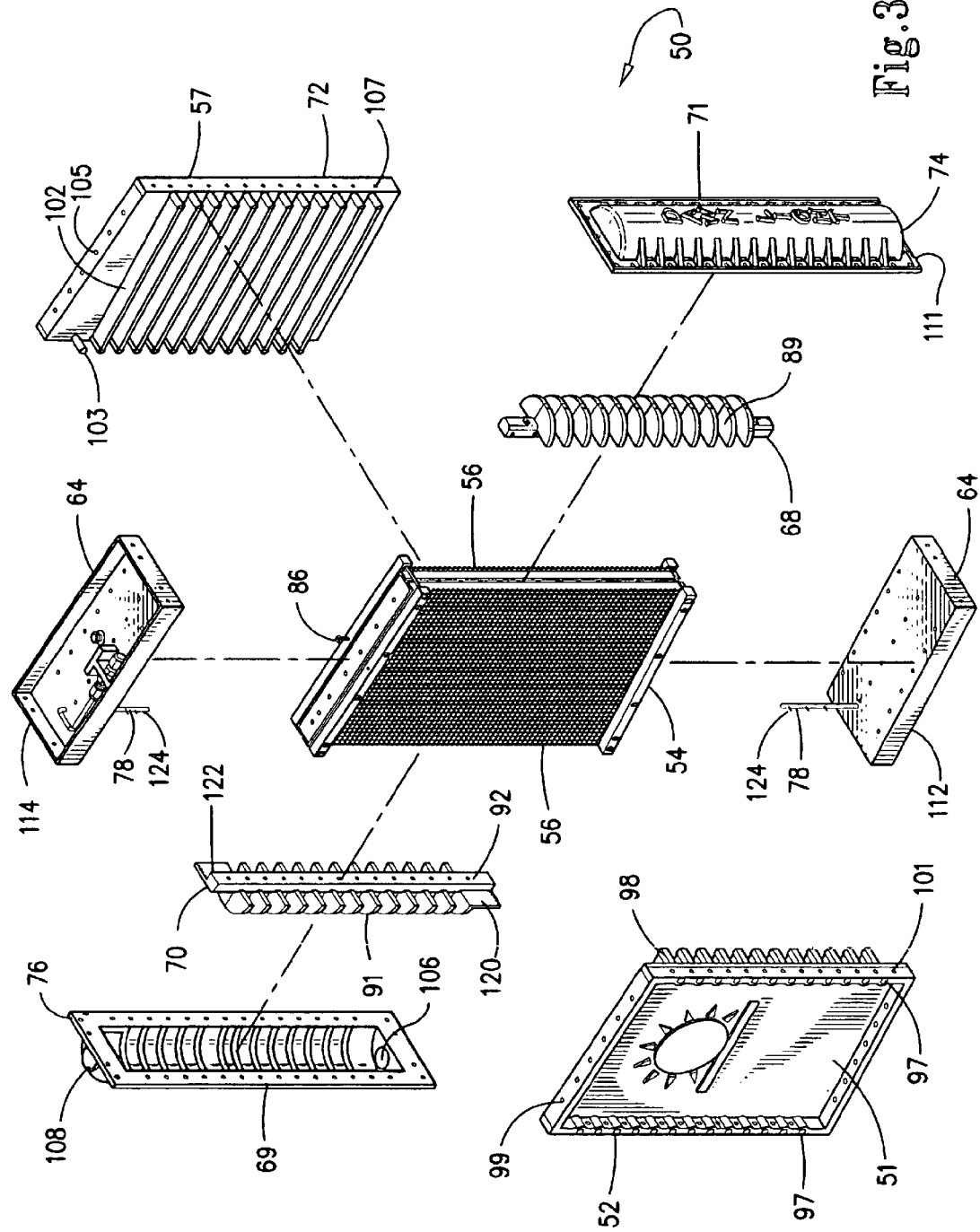
FIG. 3 is an exploded perspective view for the major components of the redox bipolar cell assembly.
Figure 4:
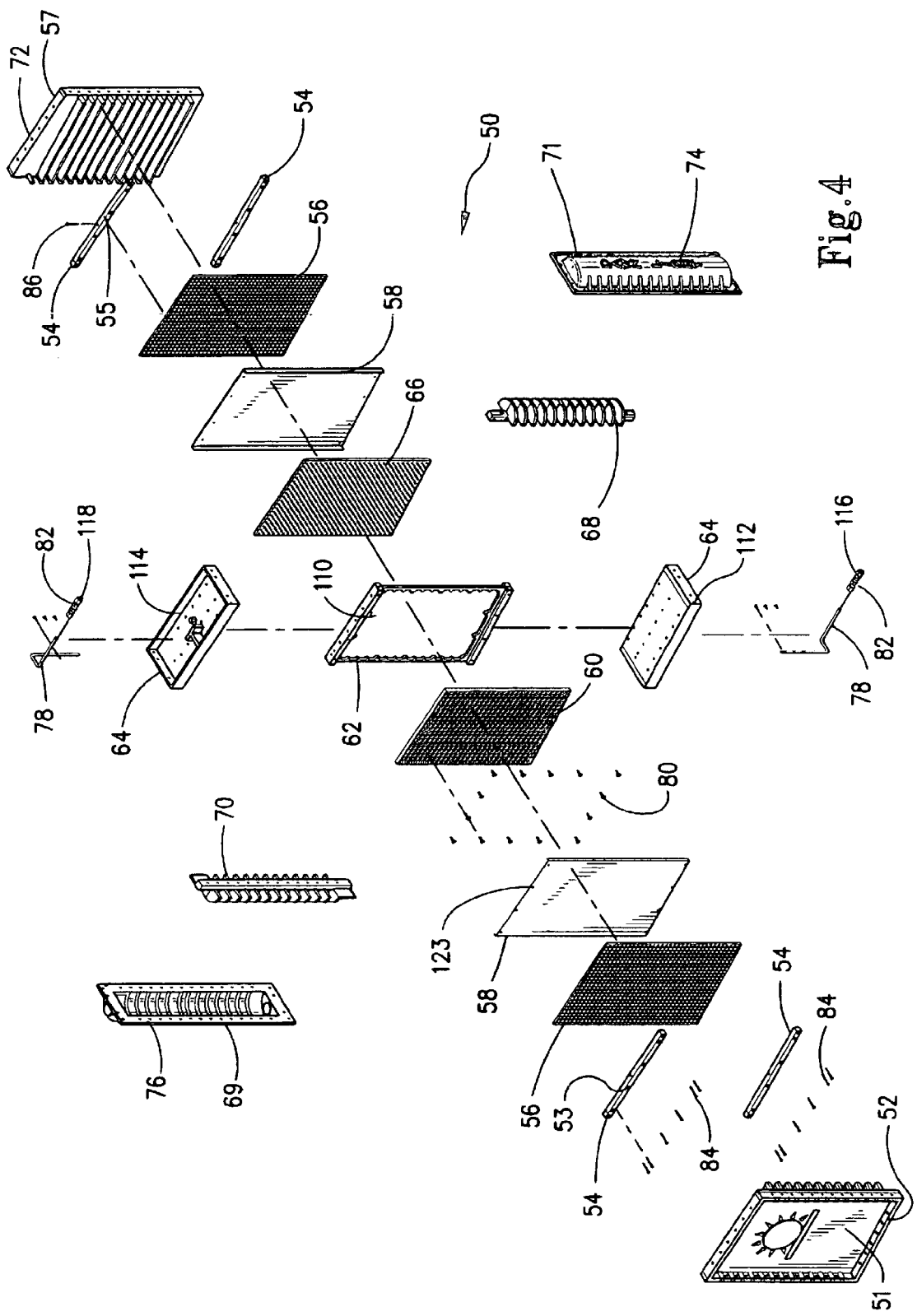
FIG. 4 is an exploded perspective view for the individual components of the redox bipolar cell assembly.
Figure 5:
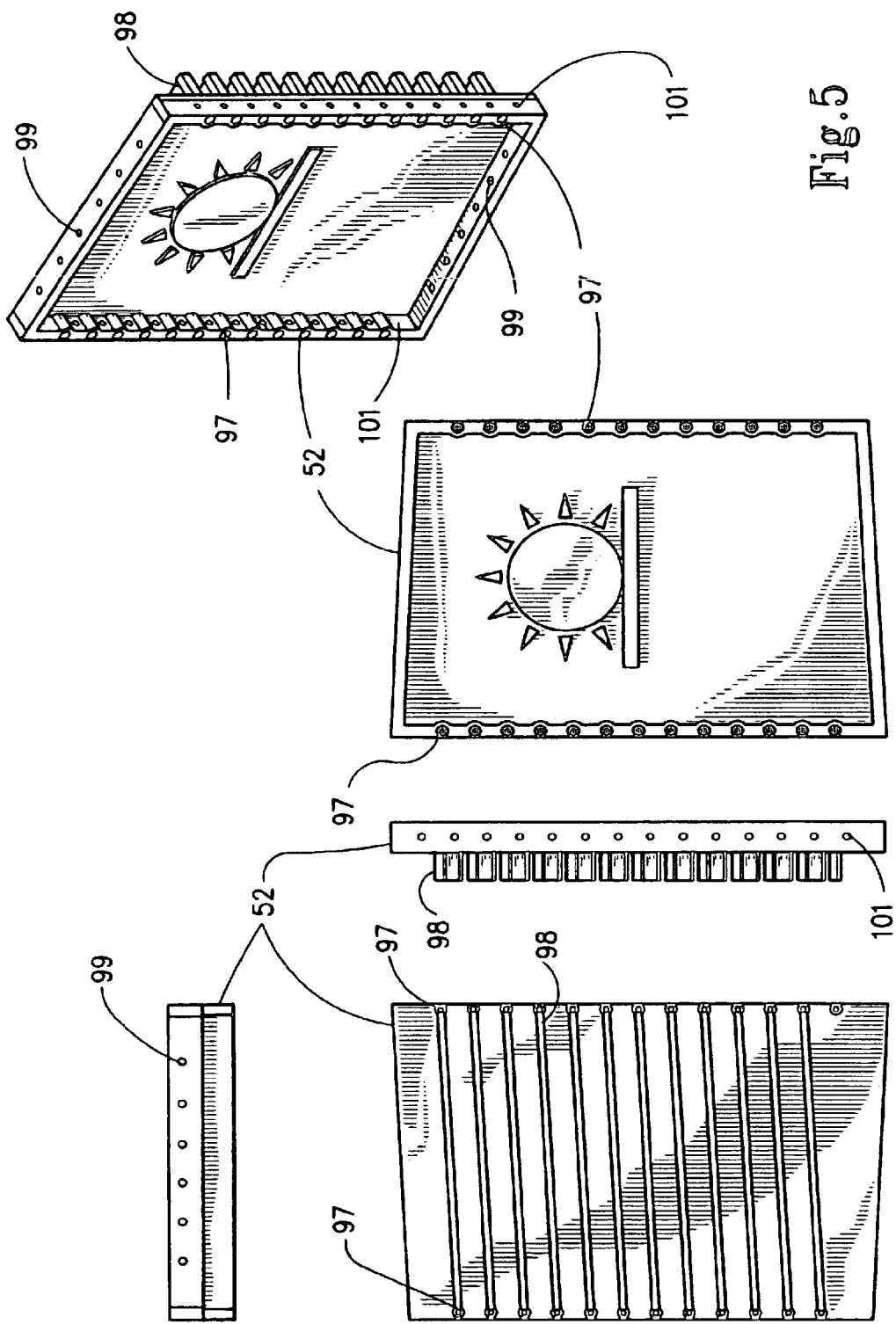
FIG. 5 shows front, back, both sides, top, and perspective views of the first side cover plate.
Figure 7:
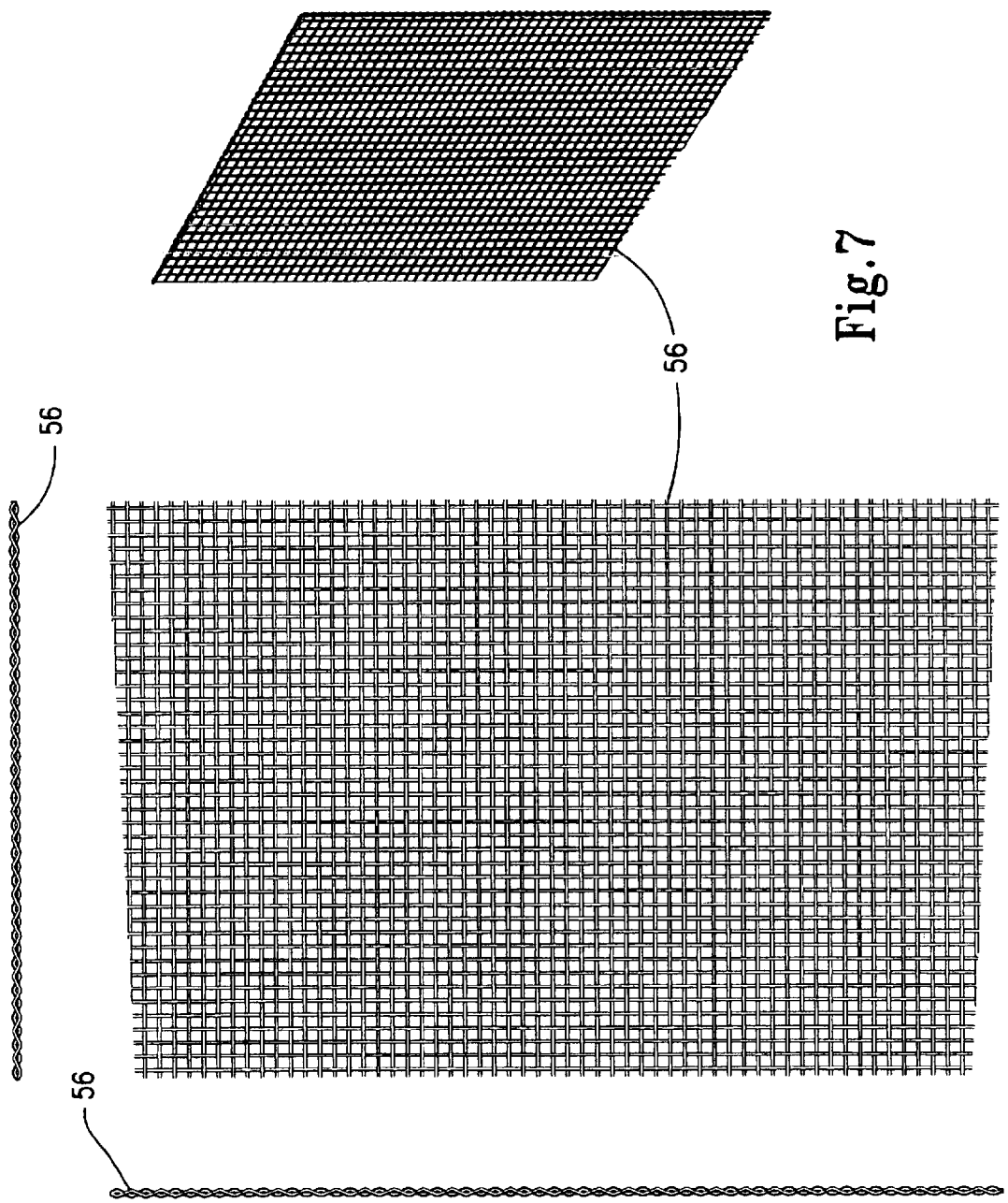
FIG. 7 shows front, top, side, and perspective views of the anode.
Figure 8:
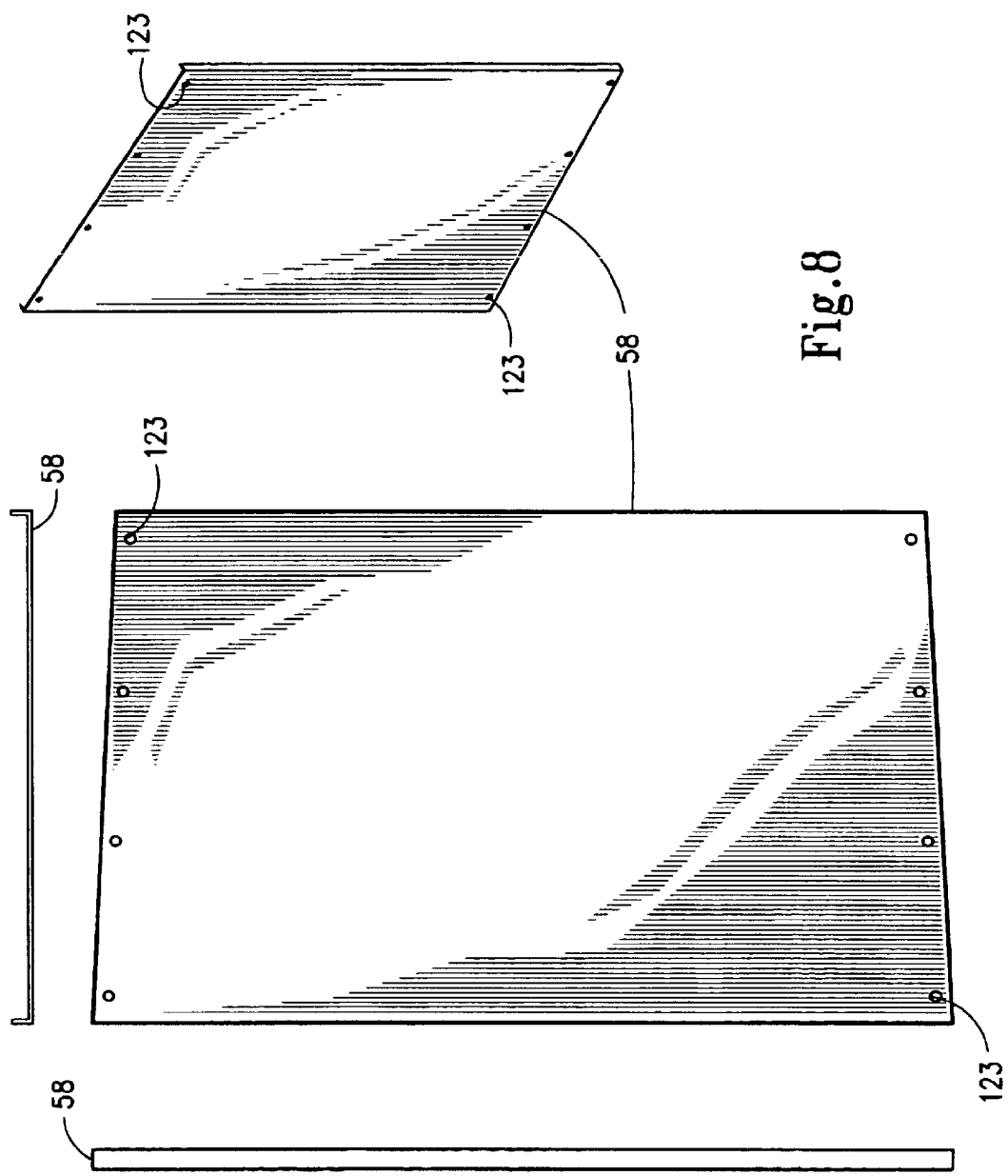
FIG. 8 shows front, top, side, and perspective views of the membrane.
Figure 9:
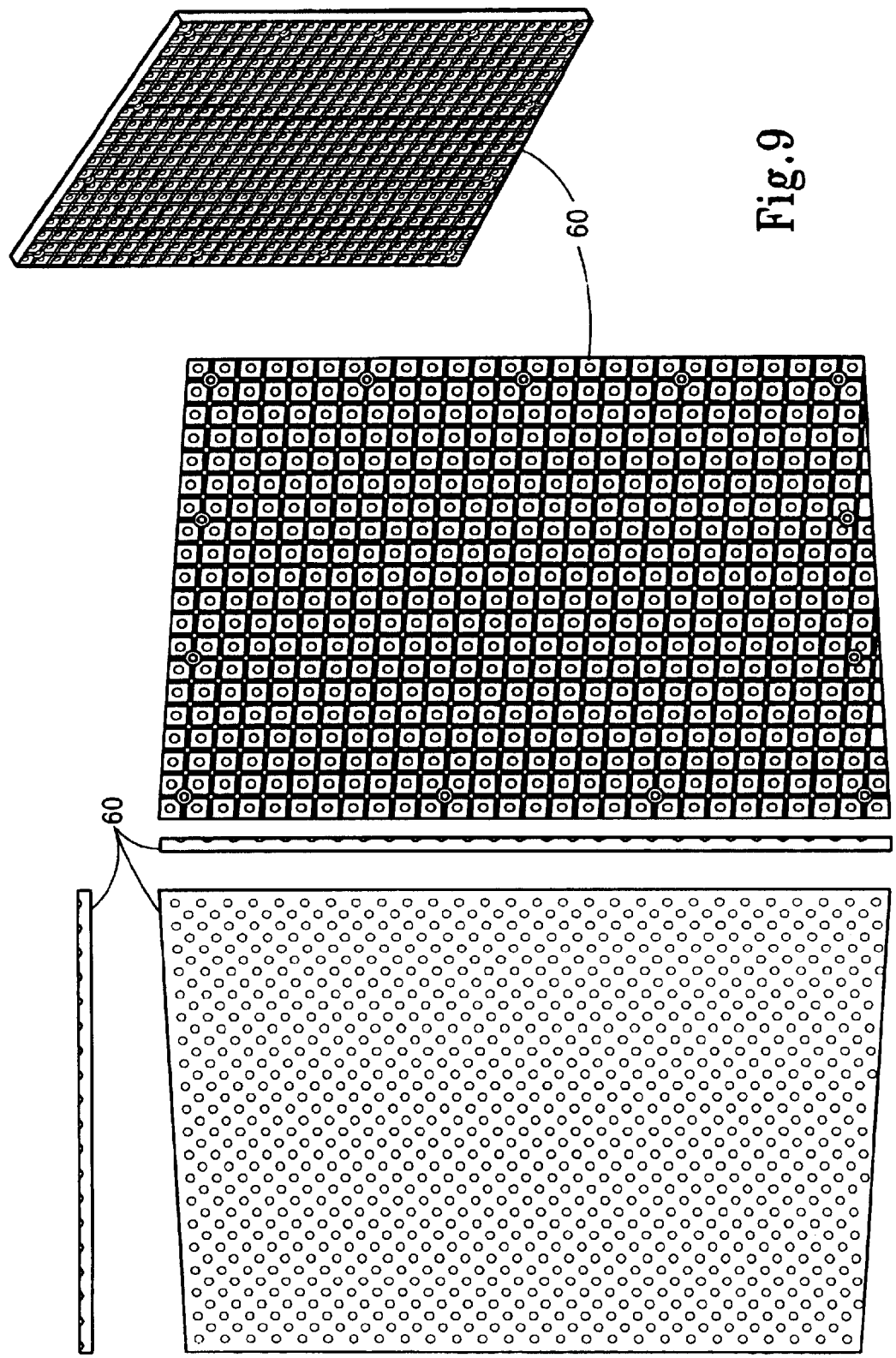
FIG. 9 shows front, back, side, top, and perspective views of the first side cathode.
Figure 10:
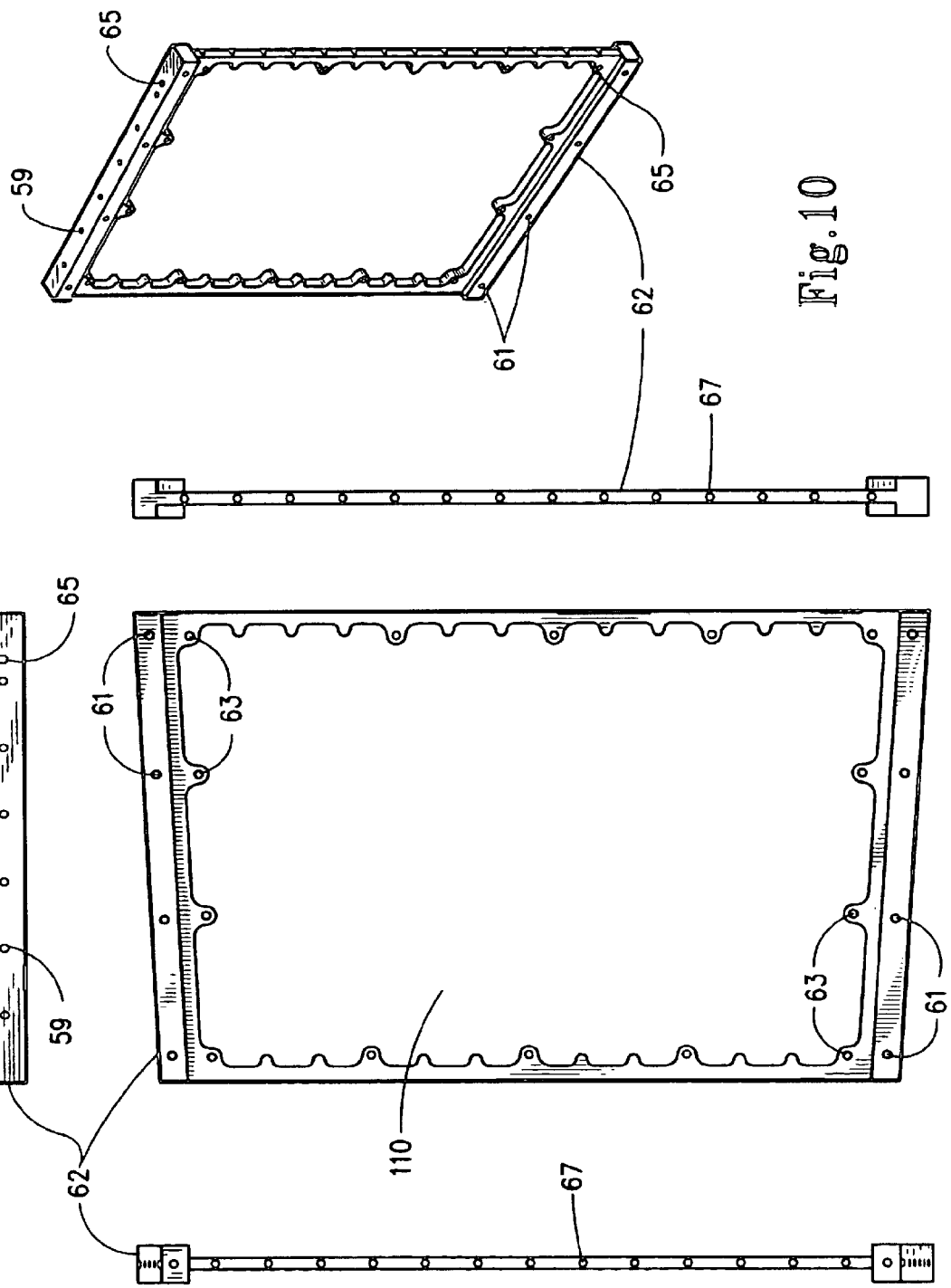
FIG. 10 shows front, sides, top, and a perspective view of the cathode spacer plate.
Figure 11:
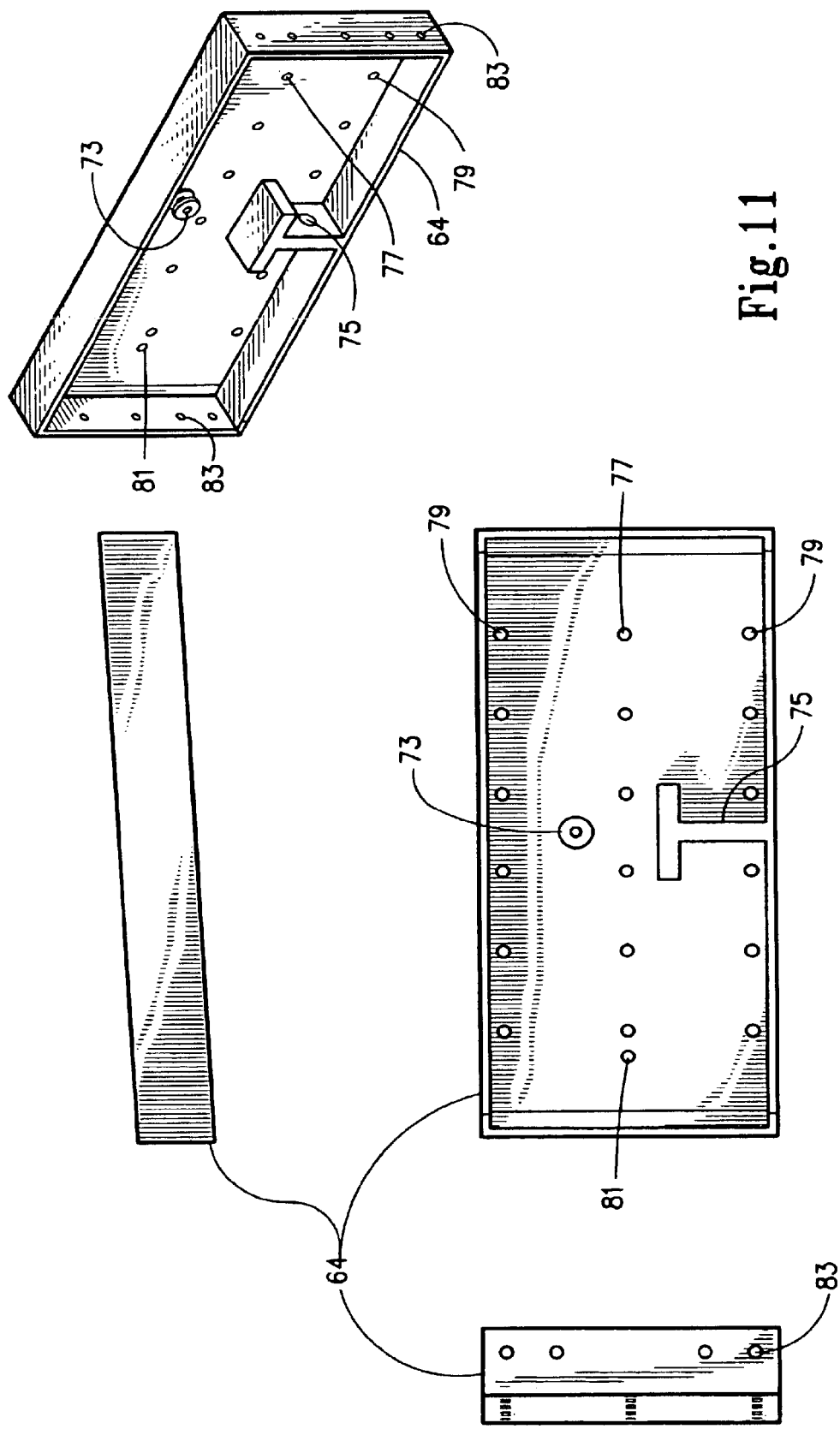
FIG. 11 shows top, side, end, and perspective views of the cap plate.
Figure 12:
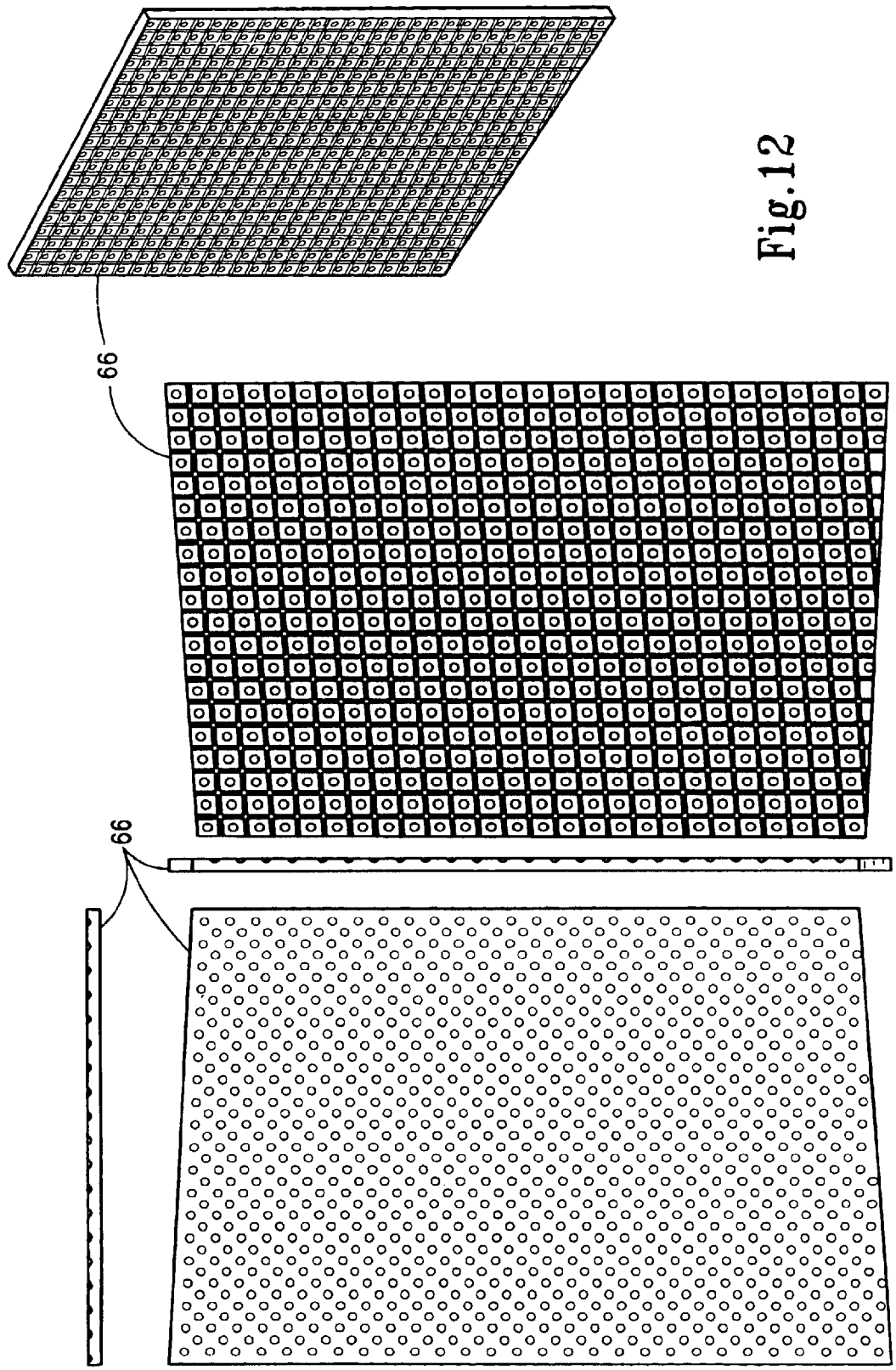
FIG. 12 shows front, back, side, top, and perspective views of the second side cathode.
Figure 13:
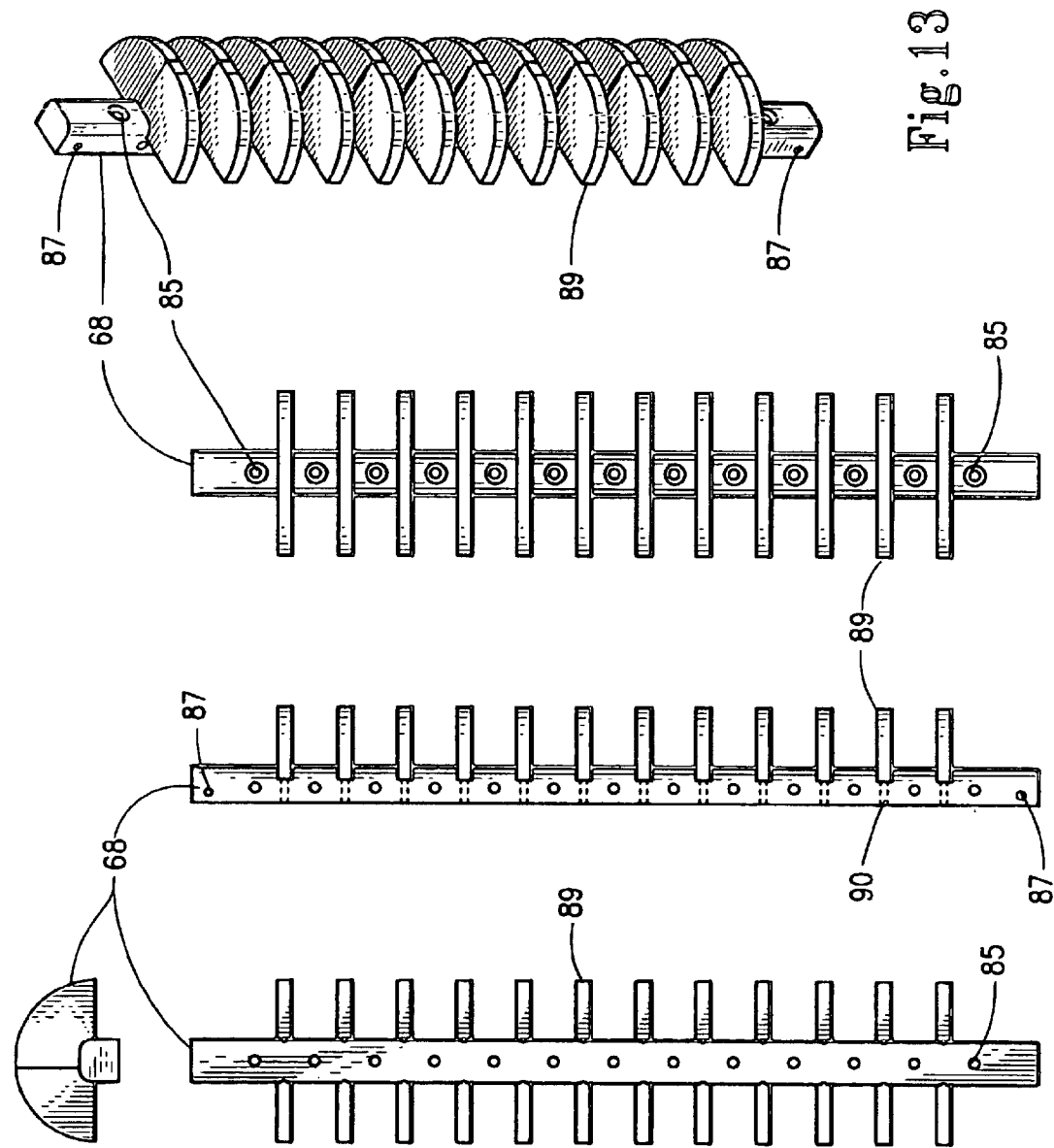
FIG. 13 shows front, back, side, top, and perspective views of the fourth side flow channel.
Figure 14:
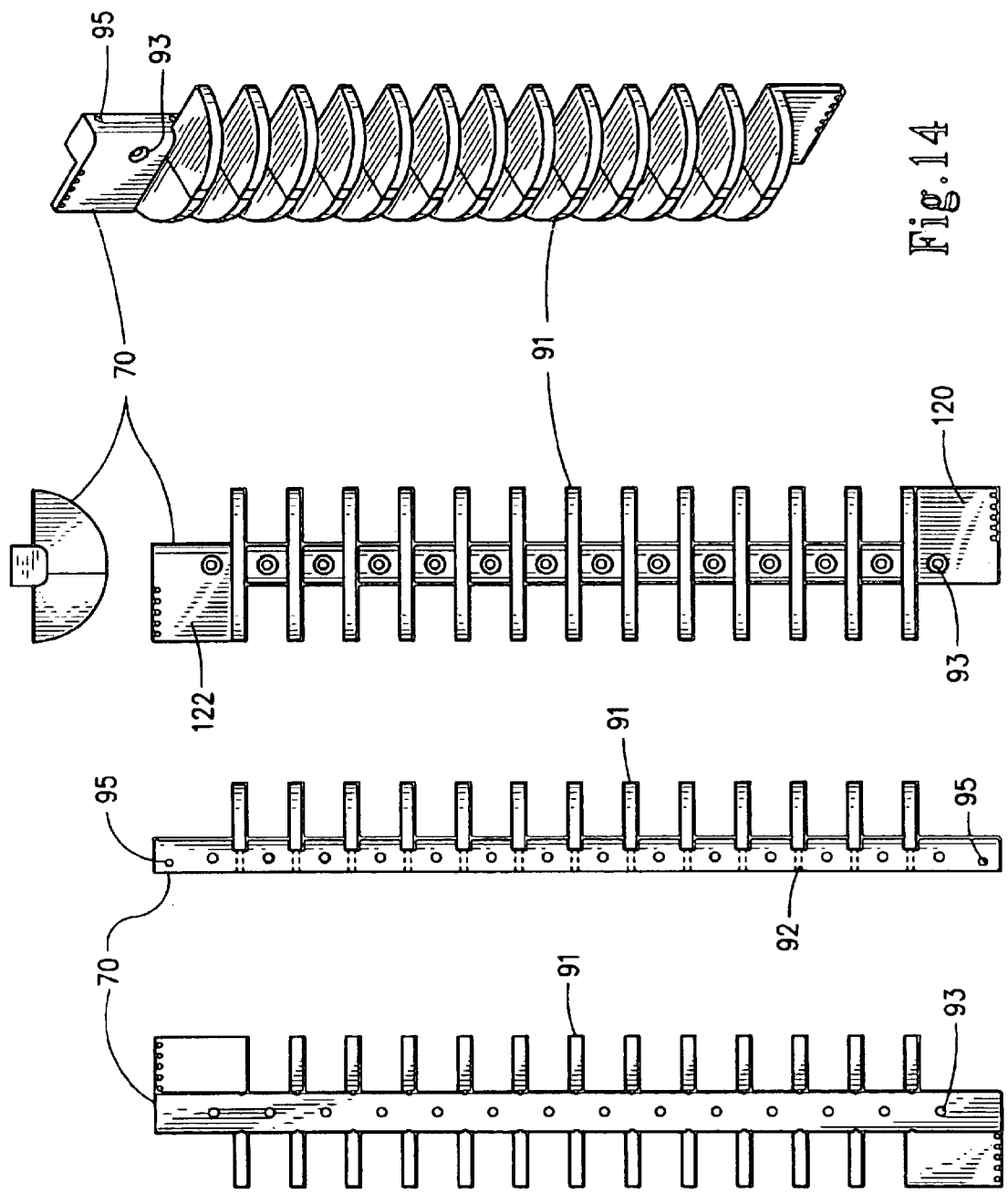
FIG. 14 shows front, back, side, top, and perspective views of the third side flow channel.
Figure 15:
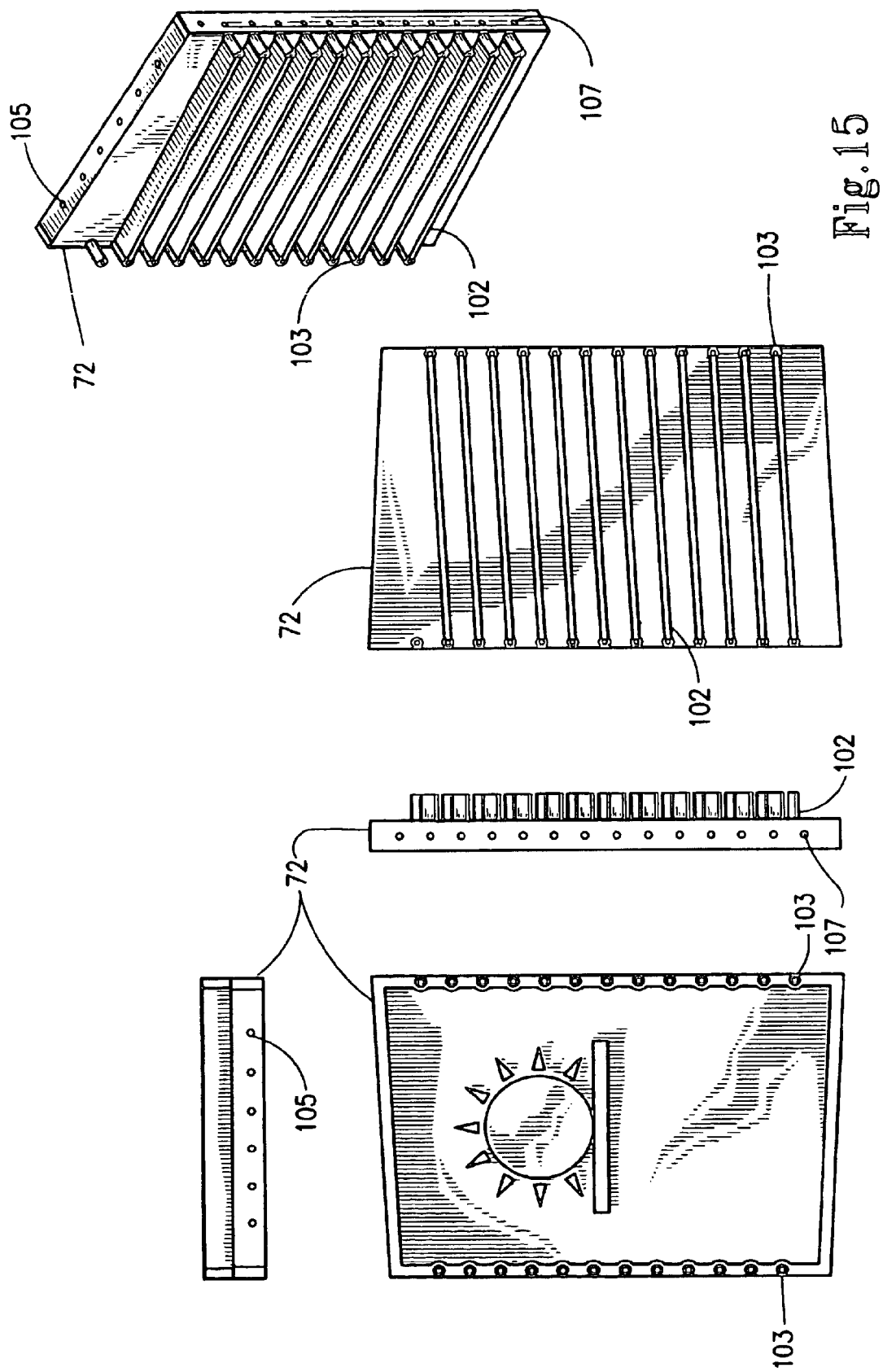
FIG. 15 shows front, back, both sides, top, and perspective views of the second side cover plate.
Figure 16:
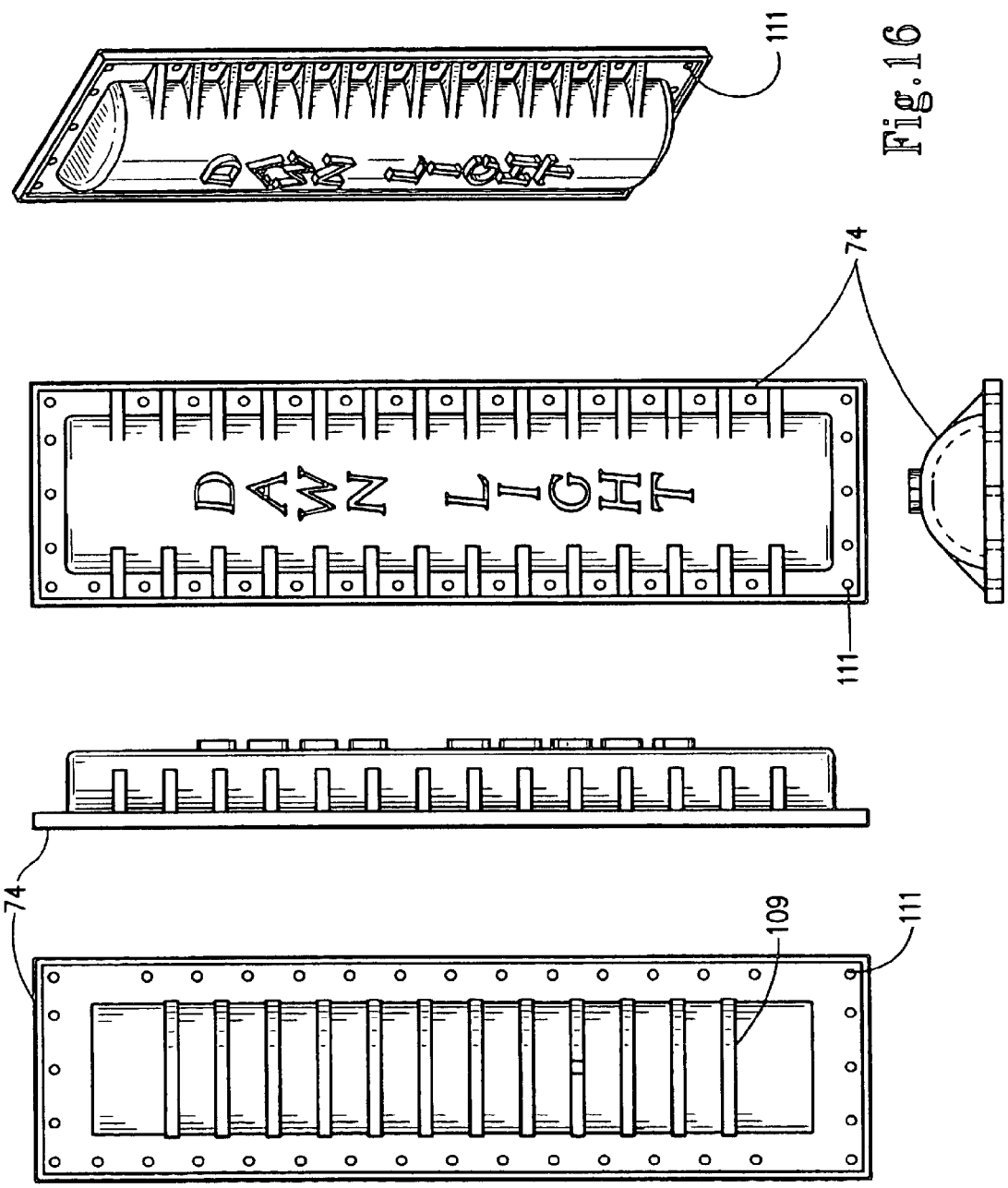
FIG. 16 shows front, side, back, bottom, and perspective views of the fourth end cover.
Figure 17:
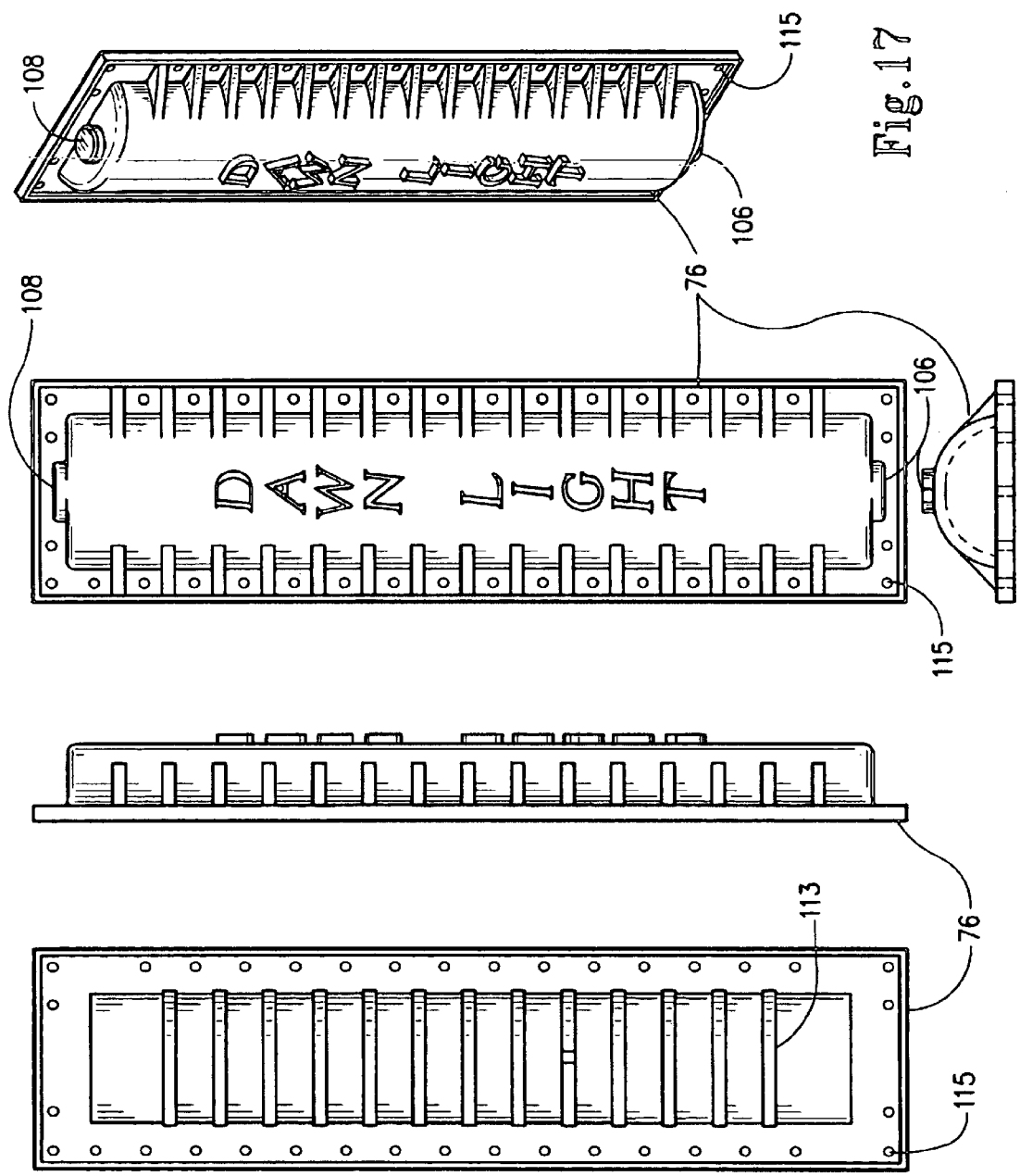
FIG. 17 shows front, side, back, bottom, and perspective views of the third end cover.
Figure 18:
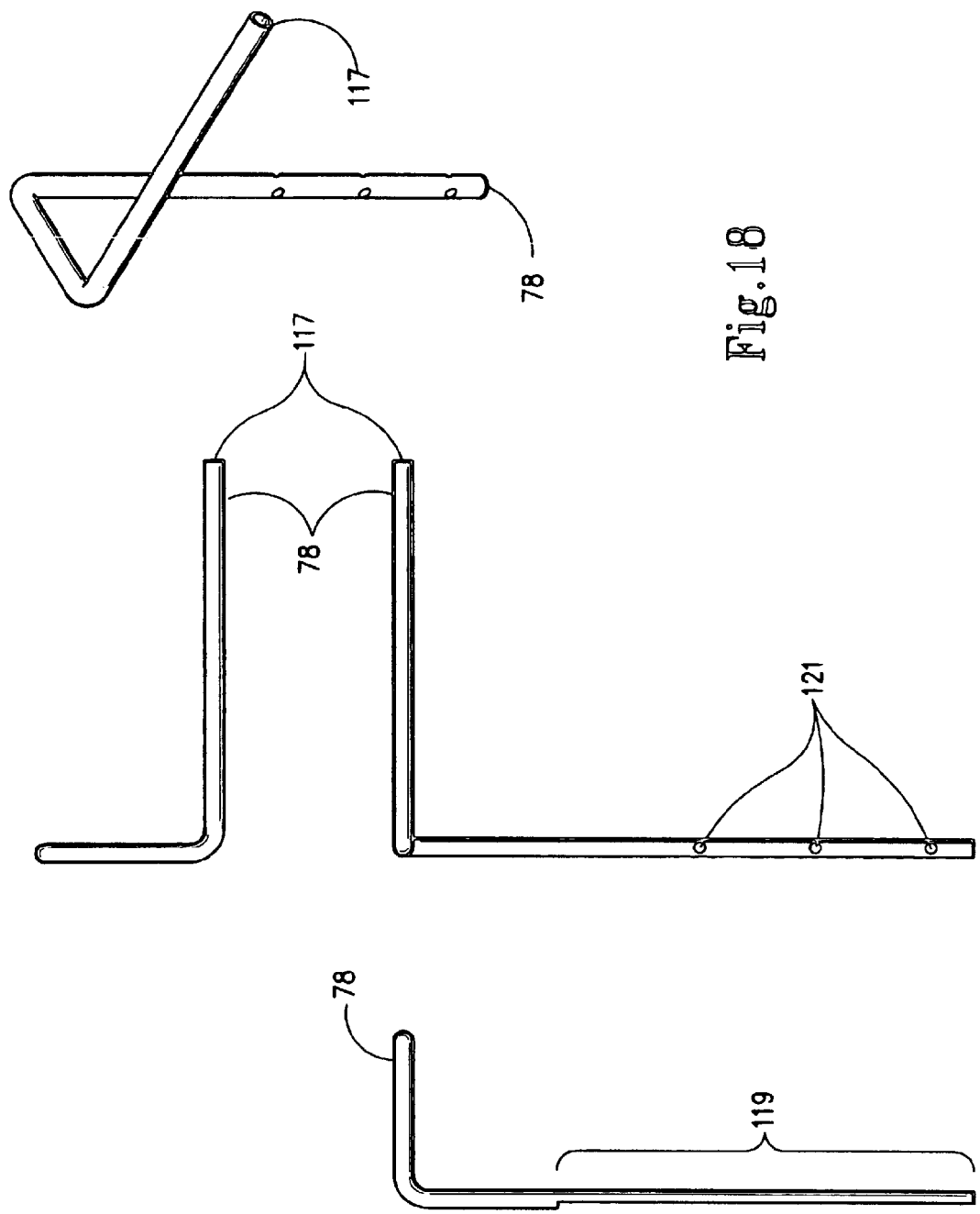
FIG. 18 shows top, front, side, and perspective views of the cathode vent conductor.
Figure 19:
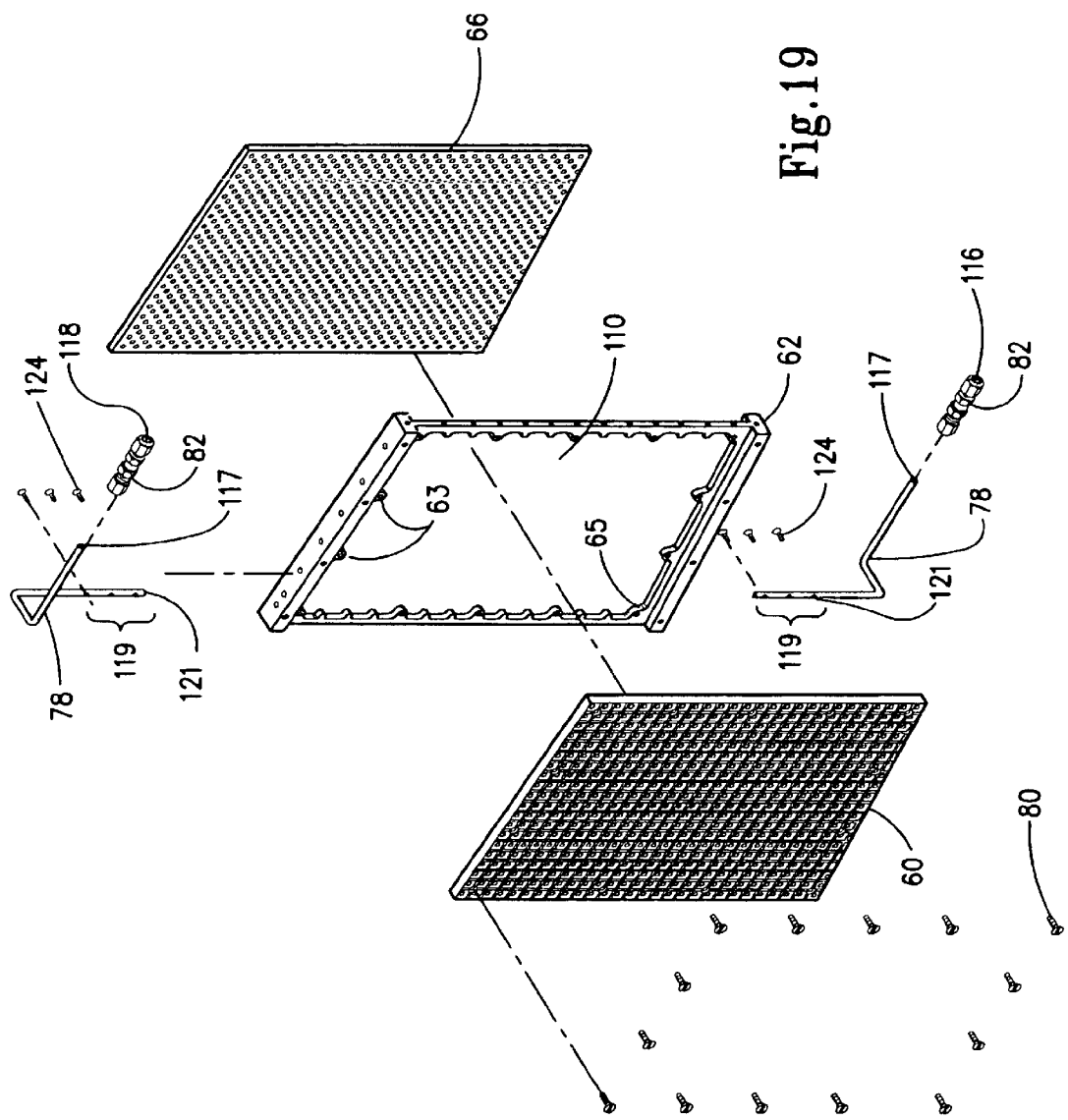
FIG. 19 is an exploded perspective view for the individual components of the cathode spacer plate, first and second side cathodes, and cathode vent conductor assembly.
Figure 20:
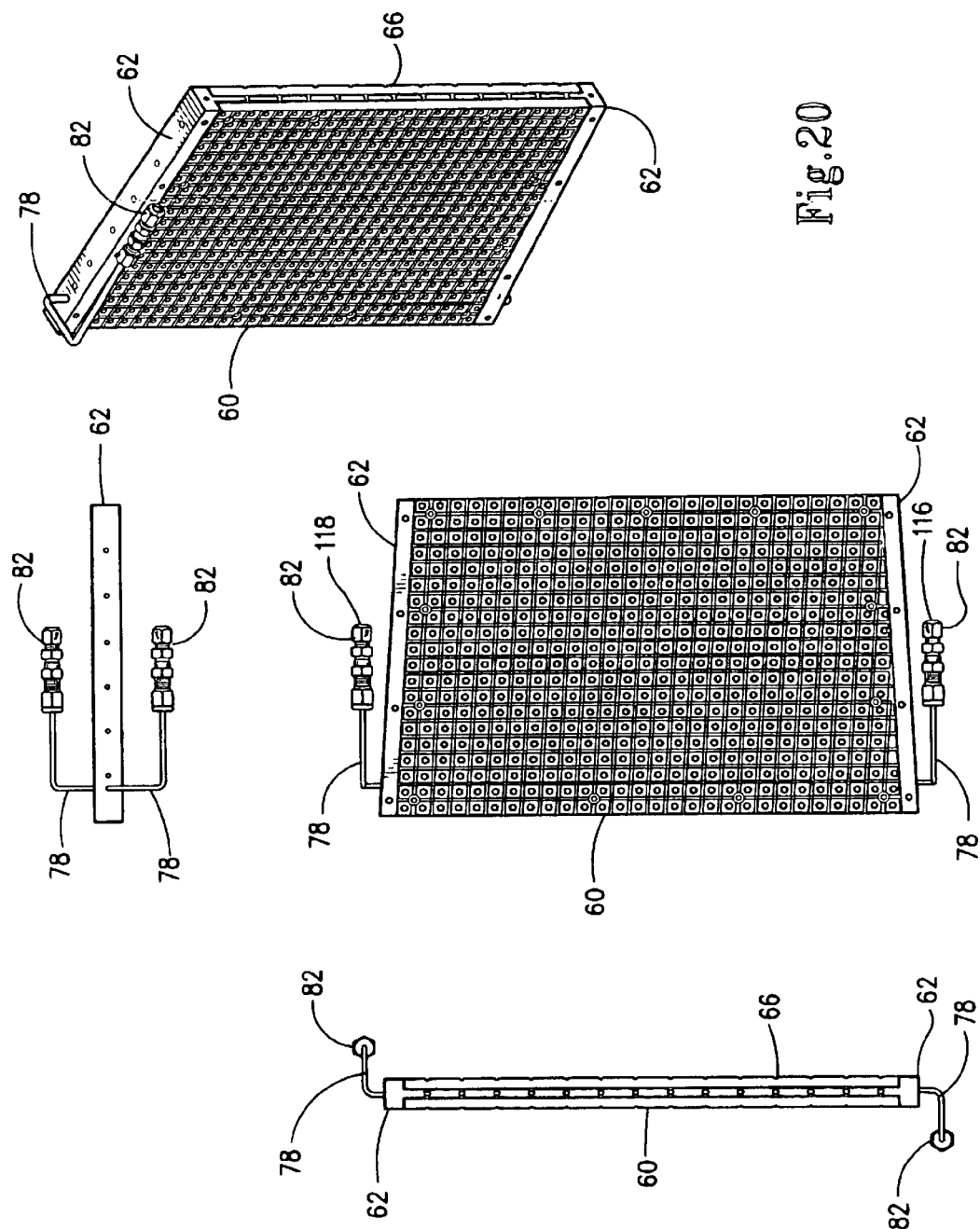
FIG. 20 shows front, top, side, and perspective views of the cathode assembly.

Next looking to FIGS. 3 and 4 shown are two exploded perspective assembly views of the redox bipolar cell assembly 50, FIG. 3 shows a partial exploded perspective view with the redox bipolar cell assembly 50 housing disassembled and the bipolar cell assembled. FIG. 4 shows a complete exploded perspective view of the redox bipolar cell assembly 50 into all of its constituent parts. Returning to FIG. 3 the major components of the redox bipolar cell assembly 50 housing are a first side cover plate 52 and a second side cover plate 72 that effectively sandwich the bipolar cell unit. Both the first side cover plate 52 and a second side cover plate 72 each have a plurality of flow channels denoted as 98 for cover plate 52 and flow channels 102 for cover plate 72, the flow channels act to increase the flow velocity of the charged wash water over the anodes 56 to increase the efficiency of the redox bipolar cell assembly 50 by increasing the number of high oxidation state oxygen ions. Also utilized in the flow channel circuit are the third side flow channel 70 its respective housing being the third end cover 76 and the fourth side flow channel 68 and its respective cover the fourth and cover 74 that act to direct the charge wash water flow from the first side of the bipolar cell assembly 51 to the second side of the bipolar cell assembly 57. The fourth side flow channel 68 utilizes flow guide plates 89 to continue to direct the flow as it is formed in the cover plates 52 and 72 respectively, also the fourth side flow channel 68 has a plurality apertures 85 that through the use of a fastener attach the fourth side flow channel 68 to the cathode spacer plate 62 using cathode spacer plate aperture 67. In addition, the fourth side flow channel 68 uses apertures 87 to provide an opening for the anode fasteners 84 to locate through. Similarly, the third side flow channel 70 uses flow guides 91 to continue directing the flow from both the first side cover plate 52 and the second side cover plate 72. Also, fastener aperture 93 allows for a fastener to connect the third side flow channel 70 to the cathode spacer plate 62 at aperture 67 in the cathode spacer plate, aperture 95 in the third side flow channel allows a faster 84 to connect through to the opposing end retainer 54. A unique feature associated with the third side flow channel 70 are an inlet flow block plate 120 and a output flow block plate 122, the function of both block plates 120 and 122 is to properly divert flow through the bipolar cell assembly 50 as the inlet tap water or charged recycled wash water enters at inlet aperture 106 and exits as charged wash water at outlet aperture 108. Subsequently, the charged wash water returns to the first side of the bipolar assembly 51 and again continuing to the second side of the bipolar cell assembly 57 thus enabling the charged wash water to flow through the bipolar cell assembly 50 in the helical manner from the inlet aperture 106 for the tap water or charged recycled wash water to the outlet aperture for the charged wash water 108.

Again referring to FIGS. 3 and 4, the bipolar cell assembly 50 housing also includes two cap plates 64, with one cap plate 64 adjacent to the inlet aperture for the tap water 106 and the other cap plate 64 adjacent to the outlet aperture for the charged water 108. The cap plates 64 also each include a cathode vent conductor 78 that is in the form of a piece of stainless steel tubing that communicates from the interior of the bipolar cell assembly denoted as a chamber 110 that forms a void between a first side cathode plate body 60 and a second side cathode plate body 66. The chamber 110 is created by the cathode spacer plate 62 that is sandwiched between the first side cathode plate body 60 and the second side cathode plate body being secured by cathode fasteners 80. External to the redox bipolar cell assembly 50 is a stainless steel tubing connector 82 that is connected to the cathode vent conductor 78 respectively in each cap plate 64, the purpose of the tubing connector 82 is to facilitate utility connections as follows, on the fifth side of the bipolar cell assembly 112 tubing connector 82 is a tap water inlet 116 and on the sixth side of the bipolar cell assembly 114 tubing connector 82 functions as a hydrogen rich electrolyte outlet 118. The tap water inlet 116 acts to form electrolyte in the chamber 110 that becomes the hydrogen rich electrolyte discharged from outlet 118. Both of the cathode vent conductors 78 also act as an electrical connection for the first side cathode plate 60 and the second sign side cathode plate 66. Mounted adjacent to each the first side cathode body 60 and the second side cathode body 66 are membranes 58 and subsequently adjacent to the membranes 58 are the anodes 56. The anodes 56 and membranes 58 are secured to the first side cathode plate 60 and the second sign cathode plate 66 by a plurality of anode retainers 54 that utilize anode fasteners 84 that act to keep the anodes 56 in electrical communication both on the first side of the bipolar cell assembly 51 and the second side of the bipolar cell assembly 57. An electrical connector 86 is in electrical communication with and one of the anode retainers 54 and subsequently with both anodes 56 on the first side of the bipolar cell assembly 51 and the second side of the bipolar cell assembly 57.

Next turning to FIGS. 5 through 18 shown are the front, back, both sides, top, and perspective detail views of the individual component parts of the bipolar cell assembly 50. Starting with the first side cover plate 52, the plurality of flow guide channels 98 that direct the charged wash water at an increased velocity a flow rate over the anodes for the purpose of increasing efficiency of the bipolar cell are shown that are generally parallel structure and slightly angled to create the helical flow pattern through the bipolar cell assembly housing. There are a number of apertures in the first side cover plate 52 for fastening the cover plate 52 to the remainder of the bipolar cell assembly. Aperture 97 is for the cover plate 52 to flow channel aperture 92 and flow channel aperture 90 fastener attachment, wherein the second side of the bipolar cell assembly 57 multiple flow channel circuit is complete going from the third side bipolar cell assembly 69 to the second side of the bipolar cell assembly 57 and onward to the fourth side of the bipolar cell assembly 71 to the first side bipolar cell assembly 51. The cover plate 52 also has an aperture 101 that accommodates the fastener from the third end cover 76 and forth end cover 74, aperture 99 accommodates the fastener from the cap plates 64 both from the fifth side of the bipolar cell assembly 112 and sixth side of the bipolar cell assembly 114.

Similarly, a second side cover plate 72, has a plurality of flow guide channels 102 that direct the charged wash water at an increased velocity flow rate over the anode 56 for the purpose of increasing efficiency of the bipolar cell, the plurality of flow guide channels 102 are shown that are generally parallel and slightly angled to create the helical flow pattern through the bipolar cell assembly housing assembly 50. There are a number of apertures in the second side cover plate 72 for fastening the cover plate 72 to the remainder of the bipolar cell assembly. Aperture 103 is for the cover plate 72 to flow channel aperture 92 and flow channel aperture 90 fastener attachment, wherein the second side of the bipolar cell assembly 57 multiple flow channel circuit is complete going from the fourth side bipolar cell assembly 71 to the first side of the bipolar cell assembly 51 and onward to the fourth side of the bipolar cell assembly 71. The cover plate 72 also has an aperture 107 that accommodates the fastener from the third end cover 76 and forth end cover 74, aperture 105 accommodates the fastener from the cap plates 64 both from the fifth side of the bipolar cell assembly 112 and sixth side of the bipolar cell assembly 114.

Anode retainer 54 includes two apertures, one is the receptacle 55 for an electrical connector 86 that accommodates the electrical connections for the anode 56, another aperture in anode retainer 54 is a plurality of fastener apertures 53 that accommodate the anode 56 fasteners 84 in securing the anode retainer 54 to the cathode spacer 62 and subsequently retaining the opposing anode 56 and anode retainer 54. The anode retainer 54 effectively clamps the anode 56 against the membrane 58 wherein the anode 56 itself has no fastener apertures. Membrane 58 has a plurality of apertures 123 for fasteners that correspond to the aperture openings 53 in the anode 56 retainer 54 in that the fasteners 84 secure not only anode 56 to the cathode spacer plate 62 but also secured the membrane 58 between the anode 56 and the cathode plates 60 and 66. The cathode spacer plate 62 utilizes a plurality of apertures 61 to accommodate the anode fasteners 84 for positioning the anode retainers 54 and the membranes 58 in relation to the cathode spacer plate 62. The cathode fasteners 80 also utilize a plurality of cathode spacer plate apertures 63 to attach both the first site cast aside cathode body 60 and the second side cathode body 66 to the cathode spacer plate 62. Cathode spacer plate apertures 67 are for receiving fasteners that secure flow channels both for the fourth side flow channel 68 and the third side flow channel 70 fasteners that are located from a plurality of apertures 85 in the fourth side flow channel 68 and a plurality of apertures 93 for the third side flow channel 70, thus allowing the flow channels to be positioned and affixed to the cathode spacer plate 62. Finally, fastener aperture 59 and of the cathode spacer plate 62 accommodates a fastener for attaching the cap plate 64 to the cathode spacer plate 62, on both the fifth side of the bipolar cell assembly 112 and the sixth side of the bipolar cell assembly 114. An aperture 65 in the cathode spacer plate 62 receives the cathode vent conductor 78 allowing both electrical and fluid communication from the cathode plate to the electrolyte chamber 110 to tubing connector 82, this is both on the fifth side of the bipolar cell assembly 112 and on the sixth side of the bipolar cell assembly 114.

The cap plate 64 forms a part of a bipolar cell assembly housing that includes the fifth side of the bipolar cell assembly 112 and the six side of the bipolar cell assembly 114. Again, there are a numerous apertures in the cap plate 64 that perform various functions. Aperture 73 in the cap plate is for the anode electrical connector 86 to insert through, aperture 81 is for the cathode vent conductor 78 to pass through, on into the cathode spacer plate 62 and subsequently into the cathode spacer plate chamber 110. Cap plate aperture 77 is to accommodate the fastener to attach the cap plate 64 to the cathode spacer plate 62 and cap plate aperture 79 utilizing a fastener attaches the cap plate 64 to both the first side cover plate 52 and the second side cover plate 72. Also, tubing connector support 75 on a cap plate 64 supports the tubing connector 82 that is attached to the cathode vent connector conductor 78 as shown, tubing connector support 75 acts to secure and position the cathode vent conductor 78 to connect to the first and second side cathode plates 60 and 66 respectively, and to also perform the functions of the hydrogen rich electrolyte outlet 118 and tap water inlet 116. Finally, aperture 83 connects the cap plate 64 to the third end cover 76 and the fourth end cover 74 to complete the bipolar cell housing assembly.

The fourth end cover 74 contains a plurality of flow guide recesses 109 in the interior portion of the cover, these flow guide recesses 109 mate with the flow guide plates 89 for the fourth side flow channel. The combination of the fourth end cover 74 and the fourth side flow guides 89 form a channel for the charged wash water to flow through on the fourth side of the bipolar cell assembly 50, thus exchanging the charged wash water from the first side of the bipolar cell assembly 51 to the second side of the bipolar cell assembly 57 and vice versa. The fourth end cover 74 also has a plurality of apertures 111 that accommodate fasteners for affixing the fourth cover 74 to the first and second side cover plates 52 and 72 respectively and the cap plates 64. The third end cover 76 contains a plurality of flow guide recesses 113 in the interior portion of the cover, these flow guide recesses 113 mate with the flow guide plates 91 for the fourth side flow channel. The combination of the third end cover 76 and the third side flow guides 91 form a channel for the charged wash water to flow through on the third side of the bipolar-cell assembly 69, thus exchanging the charged wash water from the first side of the bipolar cell assembly 51 to the second side of the bipolar cell assembly 57 and vice versa. The third end cover 76 also has a plurality of apertures 115 that accommodate fasteners for affixing the third cover 76 to the first and second side cover plates 52 and 72 respectively and the cap plates 64.

The cathode vent connector conductor 78 has a first end 117 that connects to the tubing connector 82 and a second end portion 119 that includes a plurality of apertures 121 that enable fluid communication from the first and end 117 of the cathode and vent conductor 78 to the cathode plate chamber 110. Additionally, a plurality of cathode vent conductor connectors 124 provide for an electrical connection between the cathode and vent conductor 78 and the first side cathode plate 60 and second sight side cathode plate 66.

Figure 21:
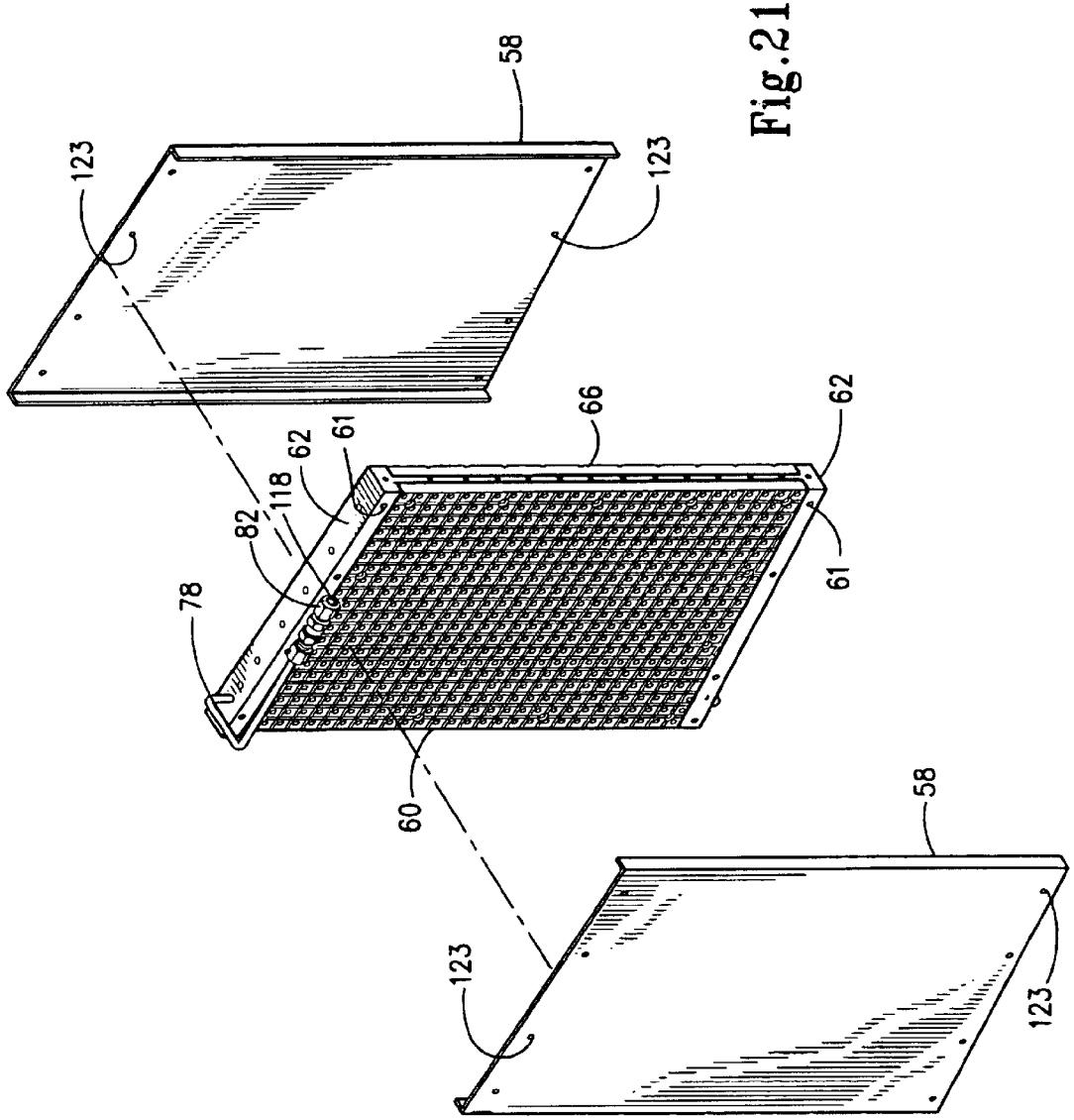
FIG. 21 shows front, top, side, and perspective views of the cathode assembly with an exploded perspective of the membranes.
Figure 22:
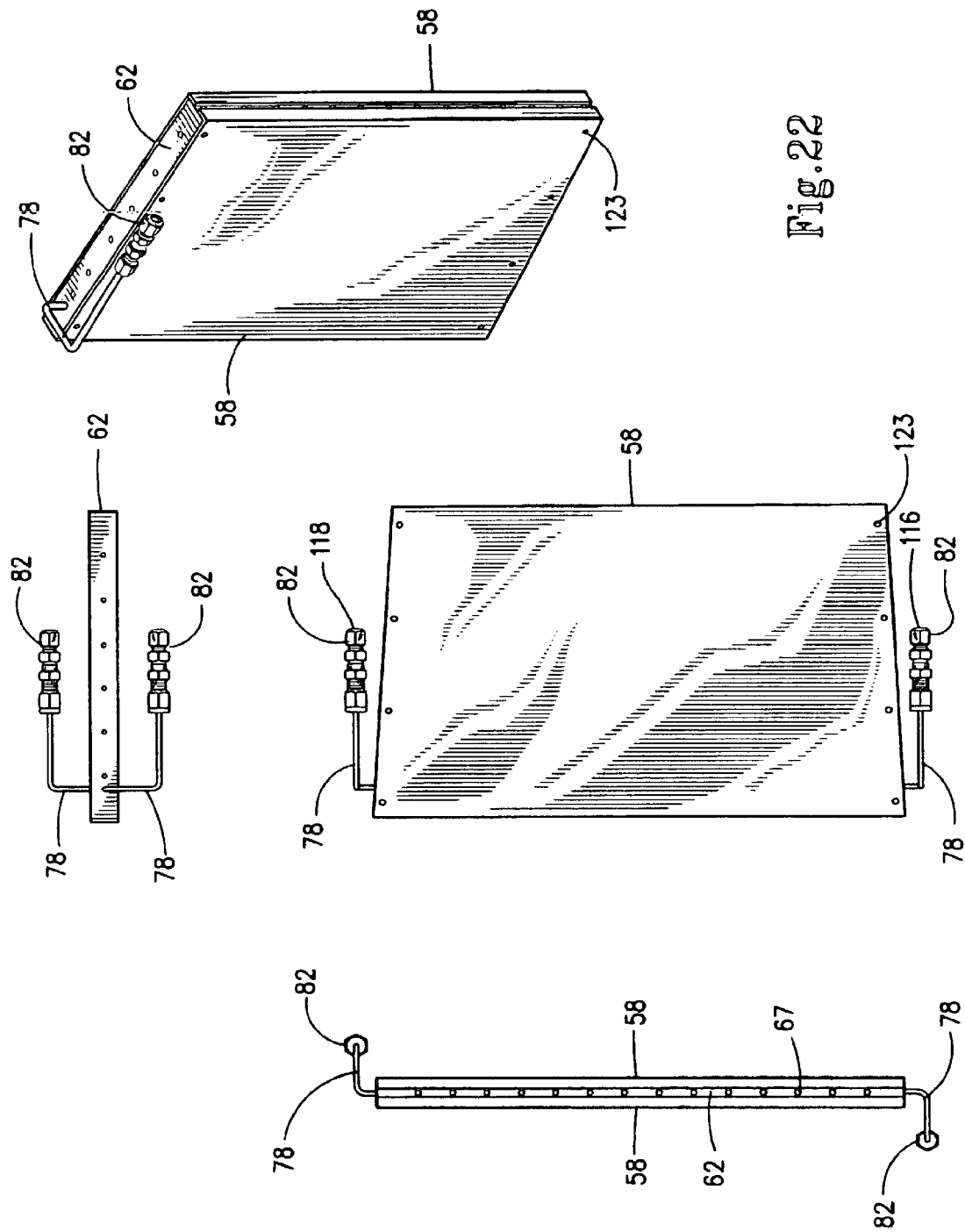
FIG. 22 shows front, top, side, and perspective views of the cathode assembly including the membranes.

FIGS. 19 through 24 sequentially show the assembly of the bipolar cell components minus the bipolar cell assembly housing. Starting with FIG. 19 the cathode spacer plate 62 the first side cathode plate 60 and a second side cathode plate 66 assemble to the cathode spacer plate 62 utilizing fasteners 80 that attach each respective cathode plate 60 and 66 to the cathode spacer plate 62 at aperture 63. When the cathode plates 60 and 66 are assembled with the cathode spacer plate 62 electrolyte chamber 110 is formed between the two respective cathode plates. Cathode vent conductors 78 insert through apertures 65 in the cathode spacer plate 62 to be in both electrical communication with the cathode plates 60 and 66 and also in fluid communication with the chamber 110. The cathode vent conductor 78 uses cathode vent conductor connecters 124 to create electrical communication between the cathode vent conductor 78 and each respective cathode plates 60 and 66, the cathode vent conductor connectors 124 are attached between the second end portion 119 of the cathode vent conductor, specifically between the apertures 121 in the second end portion of the cathode vent connector conductor and in each respective cathode plate 60 and 66. The cathode vent conductor connecters 124 are constructed of any 300 series stainless steel. The cathode vent connector conductor has a first end 117 that connects to the tubing connector 82, with a tap water inlet 116 and hydrogen rich electrolyte outlet 118. The cathode vent conductor 78 is constructed of any 300 series stainless steel tubing. Continuing to FIG. 20 the cathode plates 60 and 66 are shown assembled to the cathode spacer plate 62 with the cathode vent conductors 78 positioned on the cathode spacer plate 62, also shown are the tubing connectors 82 attached to the cathode that vent conductor 78 with their respective tap water inlet 116 and hydrogen rich electrolyte outlet 118. FIG. 21 shows the addition of the membranes 58 that are placed adjacent to the respective cathode plates 60 and 66, membrane apertures 123 align with cathode spacer plate apertures 61 for a later attachment of the membranes 58 to the cathode placer spacer plate 62 and FIG. 22 shows the membranes 58 being located in position against the cathode plates (not shown). What is visible at this point is the cathode spacer plate 62 the cathode vent conductors 78 and their associated tubing connectors 82, and the membranes 58.

Figure 23:
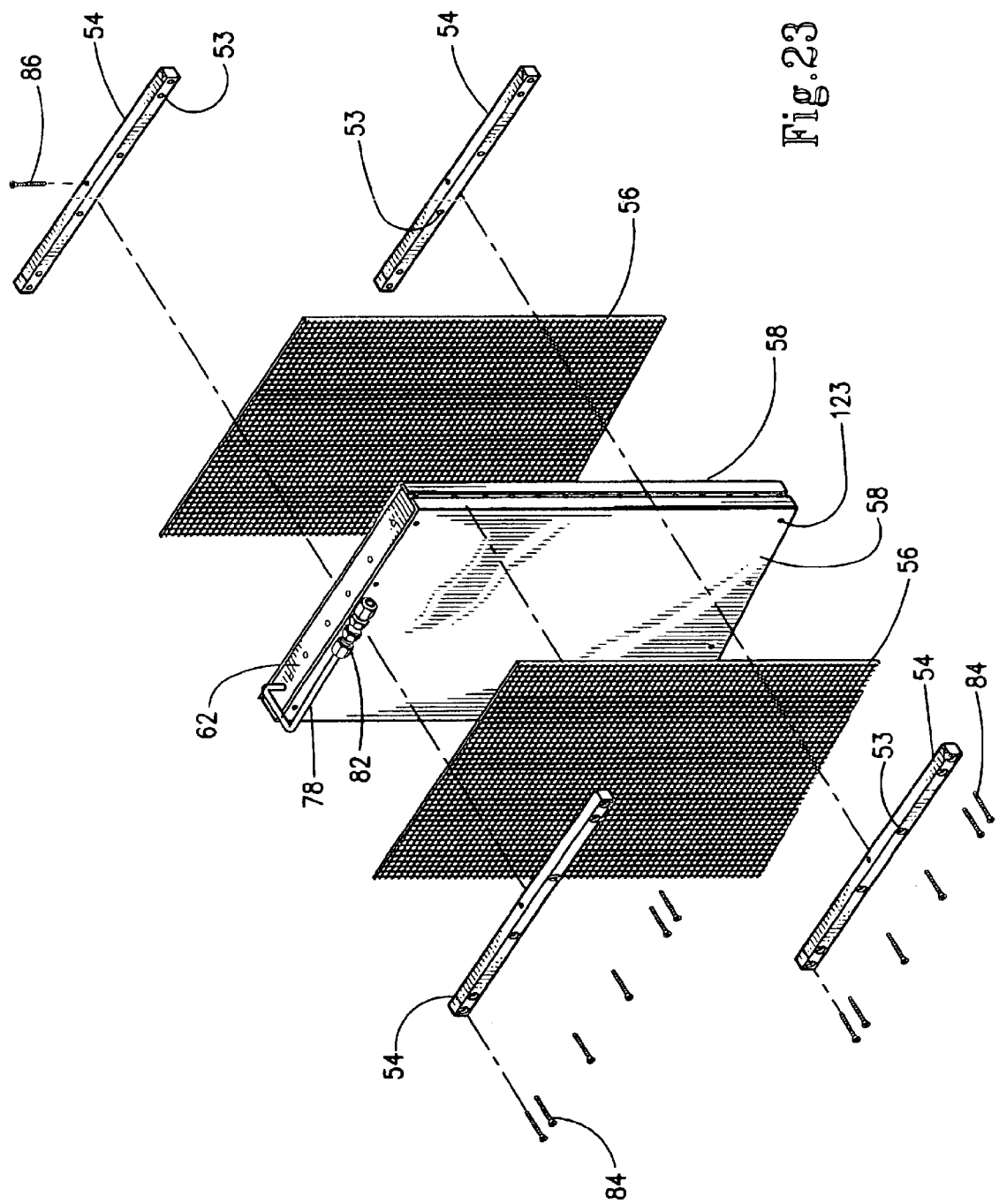
FIG. 23 is an exploded perspective view of the cathode assembly including the membranes with the anodes and anode retainers shown separately.
Figure 24:
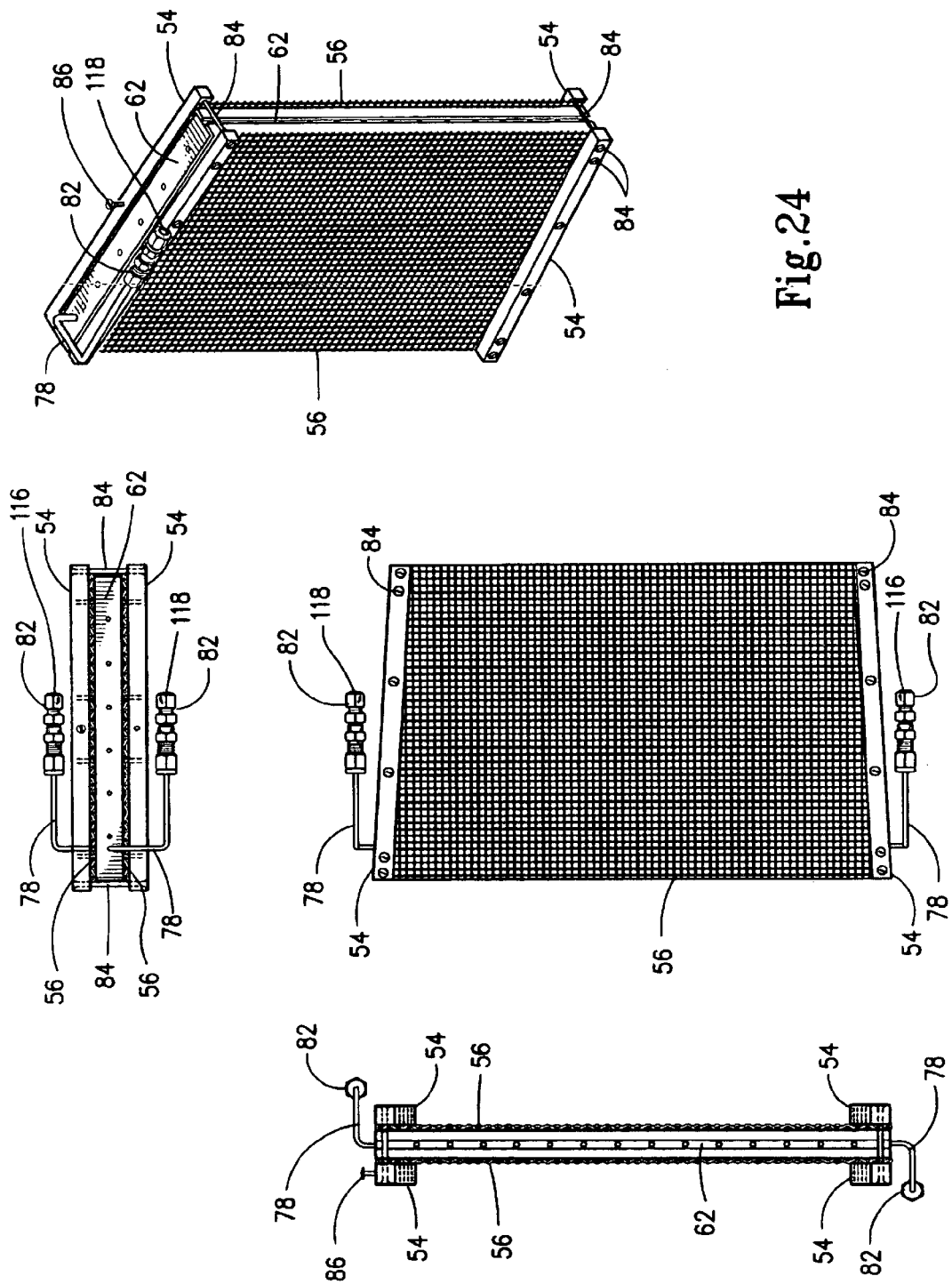
FIG. 24 shows front, top, side, and perspective views of the cathode assembly including the membranes, anodes, and retainers.

Next looking to FIG. 23 the anode plate 56 is shown in position ready to assemble against both the membranes 58 and the cathode spacer plate 62. And of fasteners 84 utilize apertures 53 in the anode retainers 54, subsequently at a faster 84 locate through the anode plates 56 continuing through the aperture 123 in the membranes 58 through the cathode spacer plate 62 and on to the opposing side through again membrane aperture 123 and of 56 and into the apertures 53 in the anode retainer 54. Also note that the electrical connector for the anode 86 is in electrical communication with the anode retainer 54. FIG. 24 shows the anode plates 56 assembled with fasteners 84 to the cathode plate 62. This constitutes the entire bipolar cell assembly less the bipolar cell assembly housing. The anode fasteners 84 provide for electrical communication between the plate 56 emanating from the electrical connection connector for the anode 86 that is in the anode retainer 54. As was previously shown the cathode and conductor 78 emanates from the cathode spacer plate 62 and terminates in tubing connector 82, with the tap water inlet 116 and hydrogen rich electrolyte outlet 118.

Figure 25:
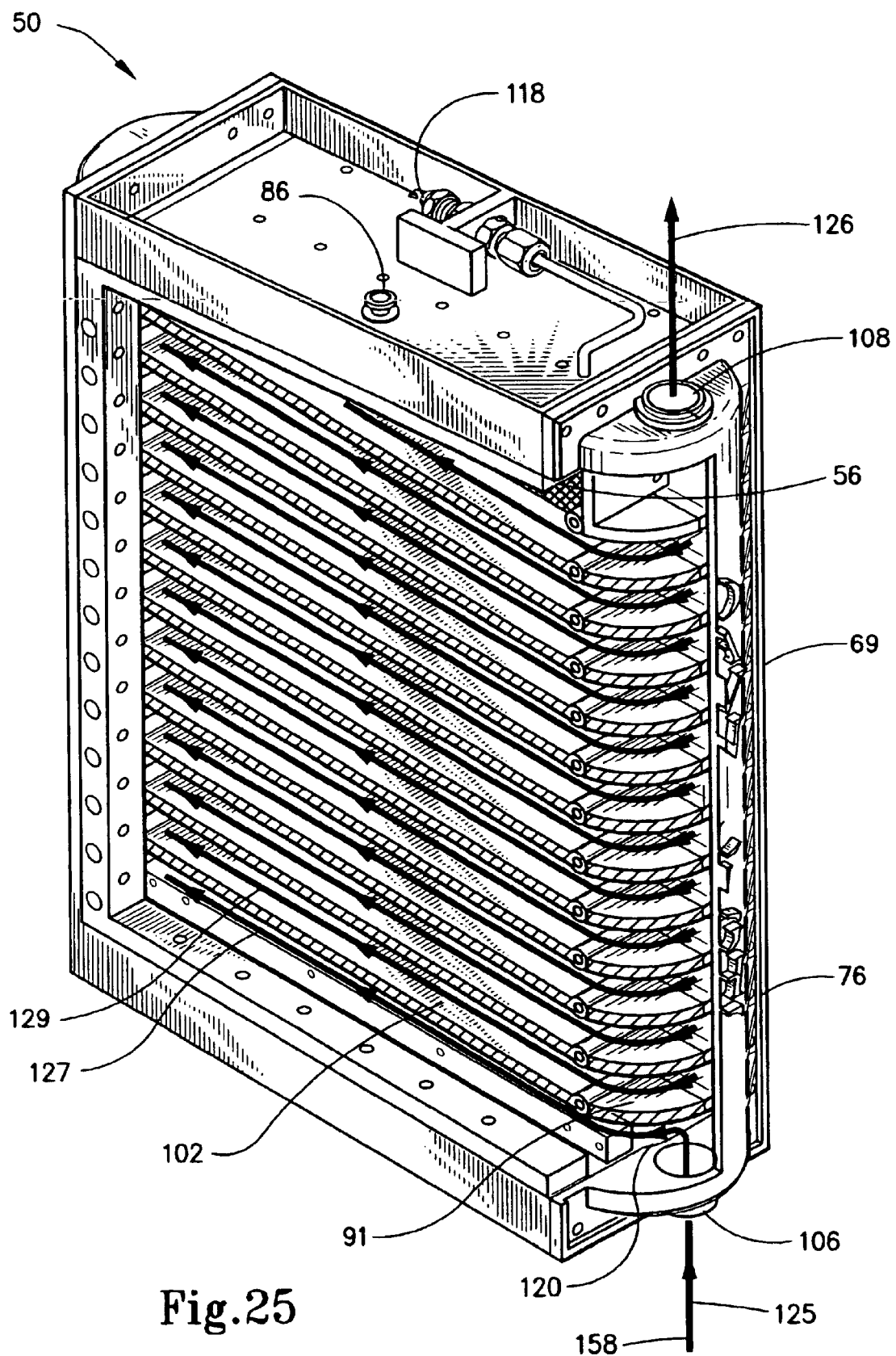
FIG. 25 shows a perspective view of the charged wash water channel flow path through the redox bipolar cell assembly.

Next turning to FIG. 25 shown is a perspective view of the charged wash water channel flow path through the redox bipolar cell assembly 50. The tap water 125 or charged recycled wash water 158 enters the bipolar cell assembly 50 at the tap water inlet aperture 106 and immediately impinges upon the channel flow block plate 122 that directs the tap water 125 into a flow channel that is bounded by flow guide 102 and the second side cover plate 57 that is not shown. Additionally, and on the third side of the bipolar cell assembly 69 shown as a cutaway, both the tap water 125 and the charged wash water 126 make a hundred and eighty degree change in direction through a flow channel bounded by flow guide plate 91 and the third side cover 76 as shown. As the tap water 125 is directed into the flow channel it starts to become charged wash water within the flow channel as depicted by 127. The charged wash water flowing in the channel 127 continues through the by the bipolar cell assembly 50 in a helical manner and returning into view as shown at the subsequent flow channel 129 and subsequently continuing until the charged wash water 126 exits from the bipolar cell assembly 50 at outlet aperture 108. A small section of the anode 56 is shown to show the positional relationship between the flow guide 102 and the anode 56. Also, the electrical connection connector for the anodes 86 is shown along with the hydrogen rich electrolyte outlet 118. The purpose of this intricate flow channel arrangement is to increase the velocity of the charged wash water over the anode plates 56 to insure that the high surface area content of the anodes is exposed to a high velocity flow rate of the charged wash water 126 through the bipolar cell assembly 50. This acts to increase the efficiency of the bipolar cell assembly 50 for the increased oxygen ion content in the charged wash water while maintaining a relatively small size for the bipolar cell assembly 50.

Figure 26:
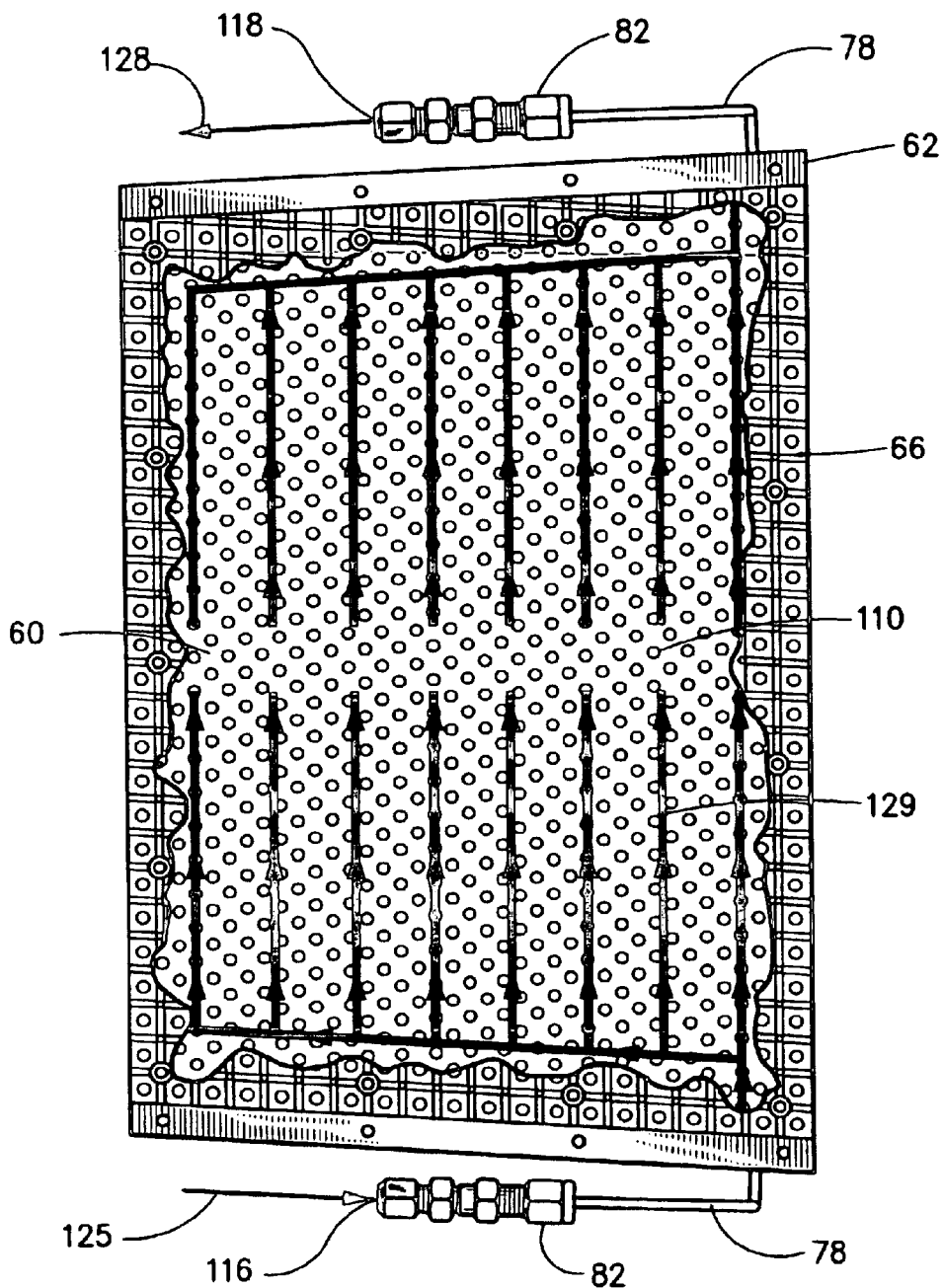
FIG. 26 shows a side view of the electrolyte flowrate through the chamber between cathode plates.

Further to FIG. 26 shown is a side view cutaway of the electrolyte flowrate through the chamber between cathode plates in the bipolar cell. Starting with the tap water 125, which enters the bipolar cell at the electrolyte inlet 116 and then proceeds through to the tubing connector 82 and onward through the cathode vent conductor 78. The tap water then exits the cathode vent conductor 78 and enters into the electrolyte chamber 110. The electrolyte chamber 110 is a void that is formed by the cathode spacer plate 62 that supports the first and second side cathode plates 60 and 66 respectively, with the void being in-between the first cathode plate 60 and the second cathode plate 66. As the tap water 125 flows into the chamber 110 it becomes an electrolyte 129 that eventually becomes a hydrogen rich electrolyte 128 that is removed from chamber 110 through the cathode vent conductor 78 and tubing connector 82 and eventually to the hydrogen rich electrolyte outlet 118. The flowrate of the electrolyte in the chamber 110 is approximately 100 milliliters per minute. Note that no additives are required to be added to the tap water 125 such as a salt for the bipolar cell assembly to function properly.

The bipolar cell assembly as disclosed has a number of features that are an improvement over the identified prior art, specifically the materials of the anode 56 and cathode plates 60 and 66 are not sacrificial materials, and other words no replacement is required of either the anode or cathode components through use of the bipolar cell assembly 50. The cathode plates 60 and 66 and anode 56 plates can be constructed of any 300 series stainless steel such as a series 303 stainless steel, 304 stainless steel, 310 stainless steel, or 316 stainless steel. In addition, the anode 56 plates can be constructed of 35A titanium, 50A titanium, 65A titanium, or 75A titanium. There are no special material coatings required for either the anode 56 or the cathode 60 and 66 components. Both the anode and cathode are designed to maximize the exposed surface area for the volume that the anode and cathode plates consume, this along with the higher charged wash water velocity acts to further increase the efficiency of the bipolar cell assembly and thus maximizing the amount of oxygen ions generated. The membranes 58 are constructed of a material that is ion permeable for a suitable cation exchange of the type conventionally used and the electrolytic cells provided with separation of the anode and cathode components in an electrolytic cell. Materials of construction for the membranes 58 are fluoridated polymers, perflurosulfonic acid polymers, such as NAFION (r) manufactured by Dupont. Additionally, the addition of a salt to form an electrolyte is not required either, as in the prior art. Materials of the bipolar cell housing which includes the first side cover plate 52, third end cover 76, third side flow channel 70, fourth side flow channel 68, fourth end cover 74, cap plates 64, cathode spacer plate 62, and the second side cover plate 72 are constructed of either polyethylene, polypropylene, or polyurethane materials.

The anode retainer 54, anode fasteners 84, cathode fasteners 80, anode electrical connector 86, and all other fasteners can be constructed of any 300 series stainless steel.

The only utility requirements for the bipolar cell assembly outside of the normally required direct current electrical power that is in the range of six to twelve volts and zero to ten amps for the anodes 56 and cathode plates 60 and 66, and the normal utilities that a prior art fabric washing machine requires as described in the following method of use. The bipolar cell assembly is designed specifically for fabric washing and normally processes approximately five to ten liters per minute of charged wash water. The charged wash water has a high oxygen ion content primarily including a molecule with two atoms of hydrogen and two atoms of oxygen and another molecule with three atoms of hydrogen and five atoms of oxygen.

Method of Use

Figure 27:
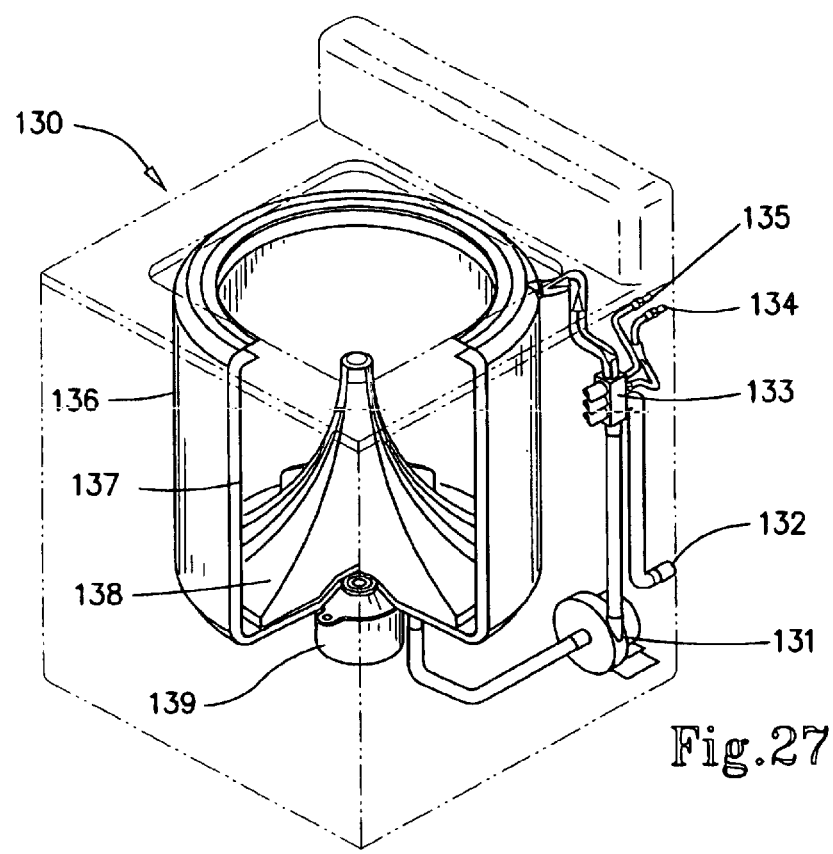
FIG. 27 shows a perspective view of a conventional prior art fabric washing machine in a fill cycle.
Figure 28:
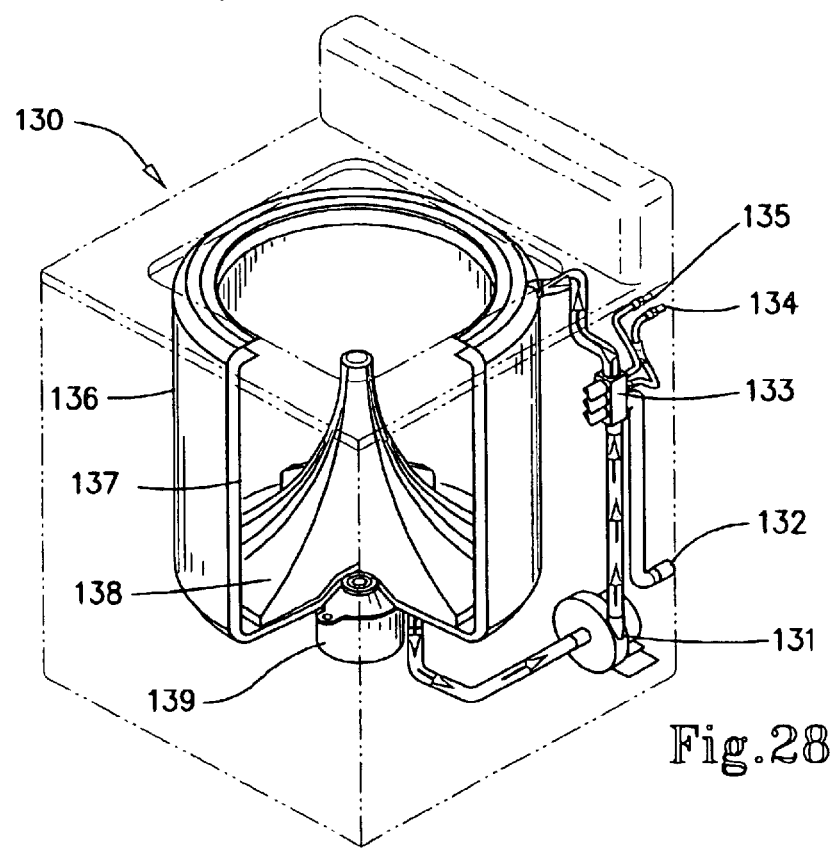
FIG. 28 shows a perspective view of a conventional prior art fabric washing machine in a wash cycle.
Figure 29:
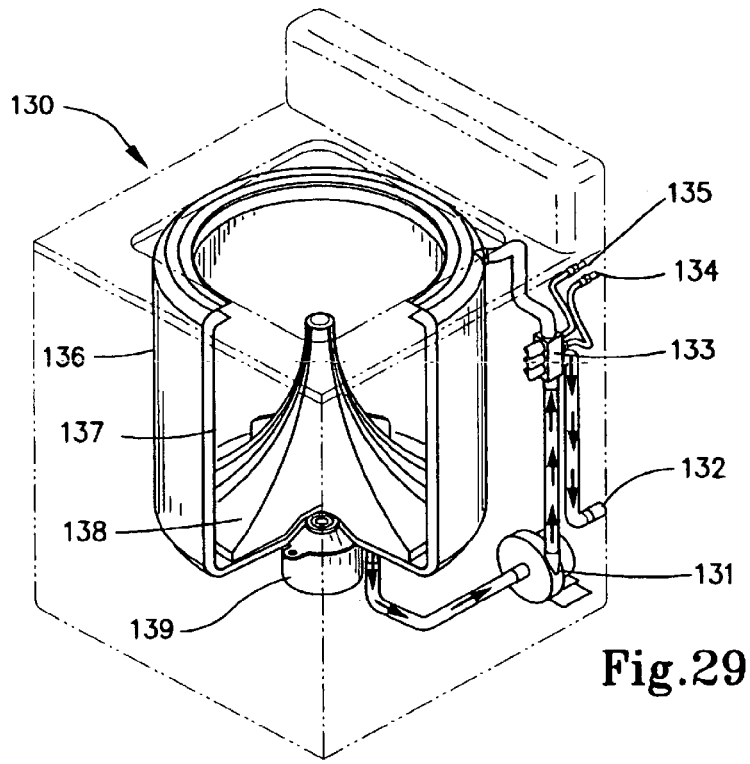
FIG. 29 shows a perspective view of a conventional prior art fabric washing machine in a drain cycle.

Starting with the prior art fabric washing technology, FIGS. 27, 28, and 29 show a prior art fabric washing machine in its three basic cycles, namely being, the fill cycle in FIG. 27, the normal washing cycle in FIG. 28, and the drain cycle as shown in FIG. 29. Other cycles, their use during the fabric washing process in the prior art, such as a spin cycle, a presoak cycle, rinse and spin dry cycles are not relevant to the portion of the prior art fabric washing technology that is of interest. The basic prior art fabric washing machine 130 includes a tub 136 and within the tub 136 is contained a basket 137, with the basket 137 and tub 136 combination allowing the spin dry cycle to function properly as the basket 137 is a perforated container wherein the tub is watertight allowing the fabrics to shed their water through the perforated basket 137 into the outer wall of the tub 136 and eventually going to the drain. The prior art fabric washing machine also includes an agitator 138 that moves in either an oscillating or rotational motion to assist the fabrics and wash water being totally circulated with each other. Agitator drive motor 139 provides the aforementioned mechanical motion to the agitator 138, while a pump and motor combination 131 provides for tub 136 wash water draining and wash water recirculation during the wash cycle. The prior art fabric washing machine 130 also includes a waste water drain 132 and two tap water inlets, a hot water inlet 134 and a cold water inlet 135, also a solenoid operated control valve manifold 133 that diverts the various tap water flows for the basic cycles of fill, wash, drain, rinse, and drain.

FIG. 27 shows the prior art fabric washing machine 130 in a fill cycle where the control valve manifold 133 is diverting water from the to tap water inlets 134 and 135 into the top of the tub 136 as a flow arrows show. This process will continue until the tub 136 is filled to an adequate level at which time the tub 136 contains the wash water, the soiled fabrics, and a selected amount of detergent. Next, onto FIG. 28 shown is the prior fabric washing machine 130 in the wash cycle. The wash cycle utilizes the pump motor combination 131 to recirculate the wash water from the bottom of the tub 136 to the top of the tub 136, also at this time the agitator 138 is engaging in rotational or oscillating motion as driven by the motor 139. The water temperatures and length of time and that the wash cycle continues are based upon a selected wash cycle type typically determined by the materials of the fabrics being washed. FIG. 29 shows a prior art fabric washer 130 in a drain cycle, wherein the pump motor combination removes the used wash water or wastewater from the bottom of the tub 136 and to exit at the wastewater outlet 132. And this point the basic prior art fabric washing machine wash cycle has been described using the fill, wash, and drain cycles as illustrated.

Although the prior art fabric washing machine 130 performs its function in an adequate manner, it is a utility wasteful and polluting type process. Typically, large volumes of water are used to clean the fabrics; the detergents used have pollutants that end up in the wastewater drain, in addition to shortening the life of the fabrics, and causing allergic reactions to individuals, as there can be some residual detergent that remains in the fabrics. There's also the additional cost of detergents and the additional accompanying wash water additives, such as fabric softeners and bleaches that also add to fabric break down or shorter fabric life, add cost, and cause additional environmental pollutants.

Figure 30:
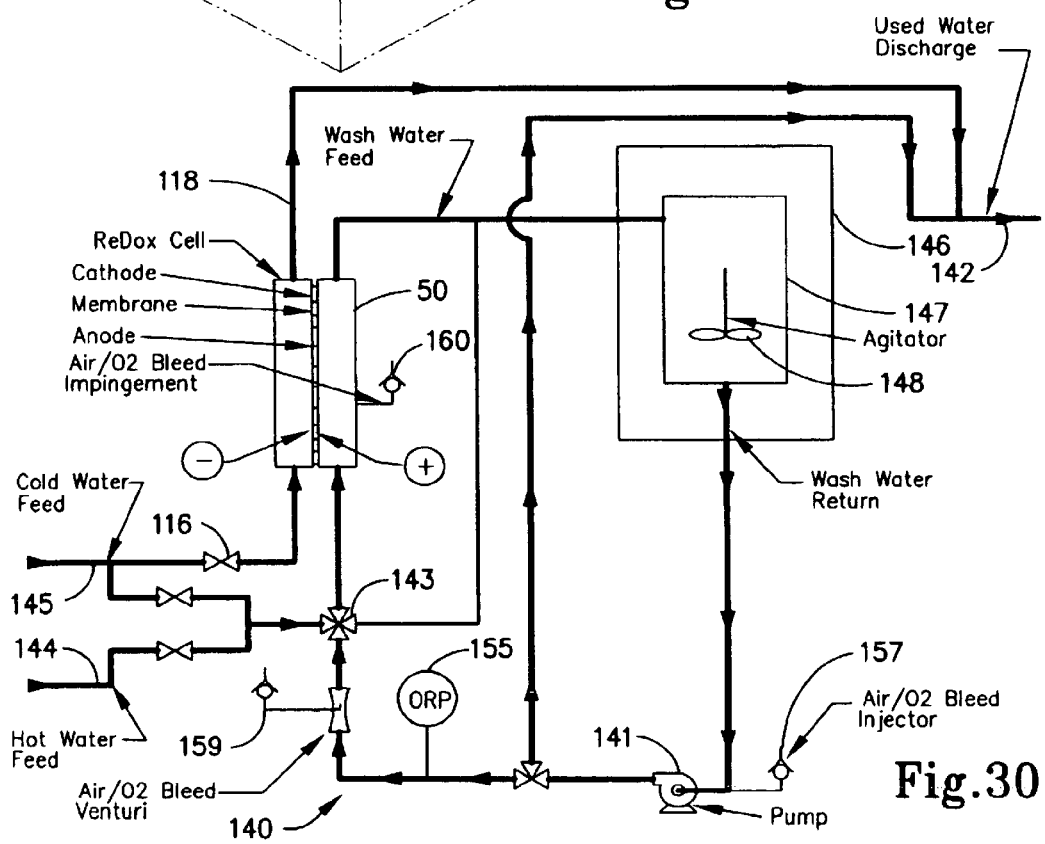
FIG. 30 shows a schematic of a redox bipolar cell fabric washing machine.
Figure 31:
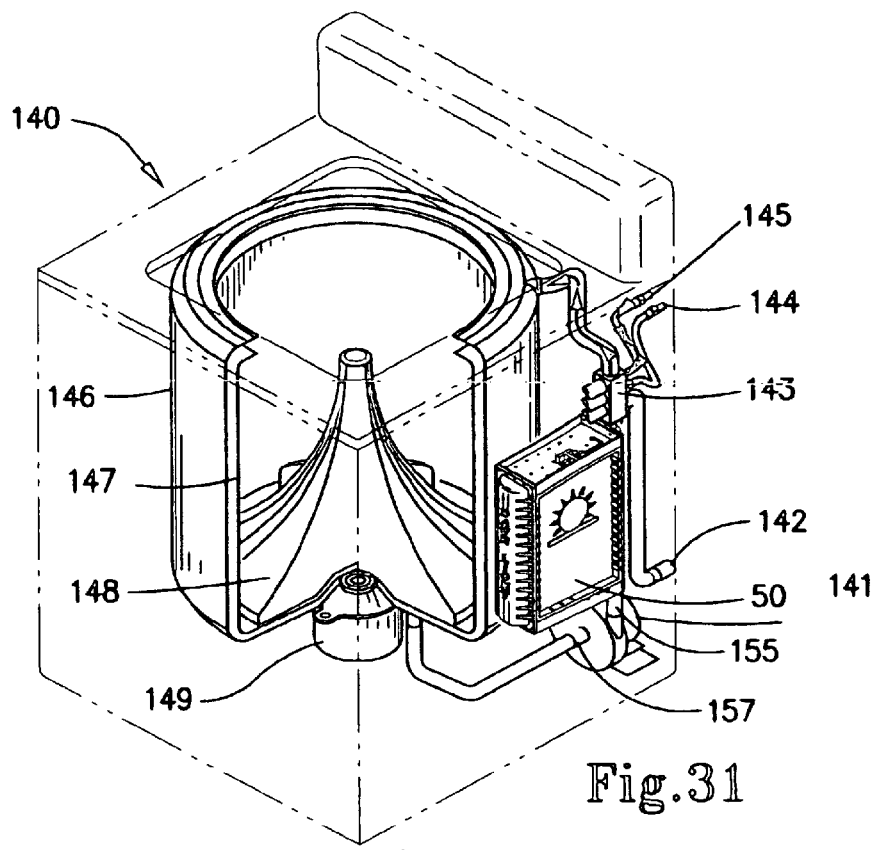
FIG. 31 shows a perspective view of a redox bipolar cell fabric washing machine in a fill cycle.
Figure 32:
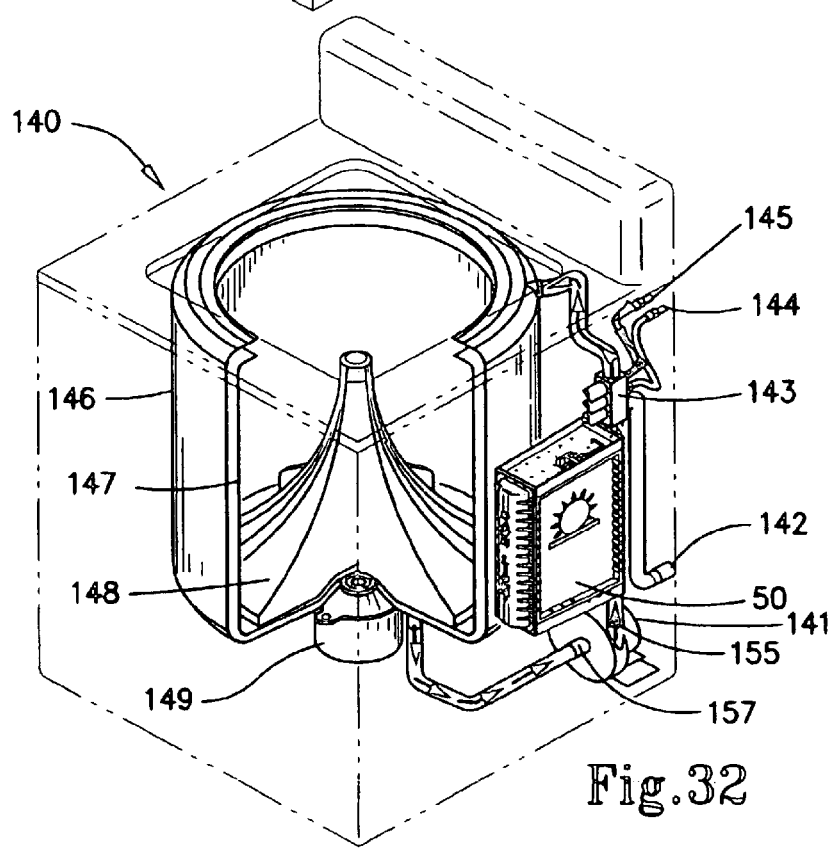
FIG. 32 shows a perspective view of a redox bipolar cell fabric washing machine in a wash cycle.
Figure 33:
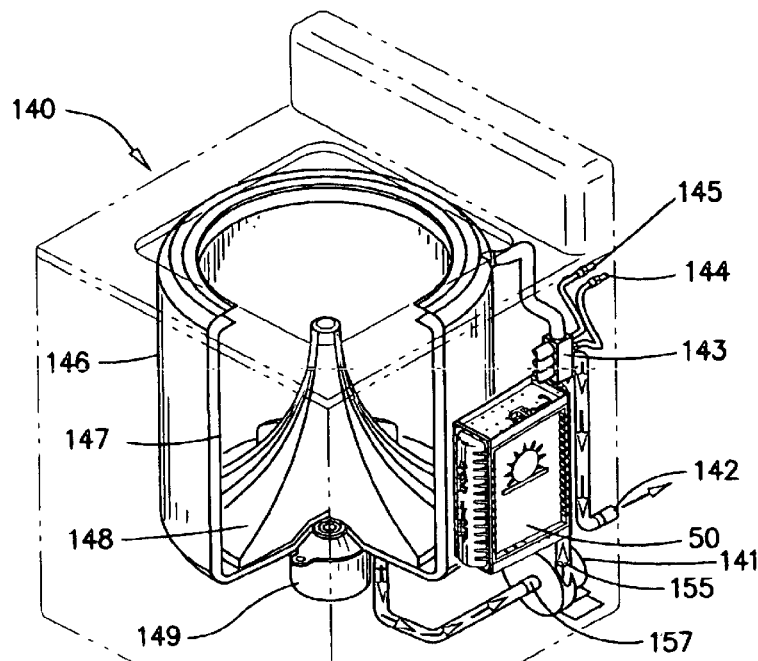
FIG. 33 shows a perspective view of a redox bipolar cell fabric washing machine in a drain cycle.

FIGS. 30, 31, 32, and 33 show the basic bipolar cell fabric washing machine 140. FIG. 30 shows a fluid schematic of the basic bipolar cell fabric washing machine 140 and FIGS. 31, 32, and 33 show perspective views of the basic bipolar cell fabric washing machine 140. FIG. 31 shows the bipolar cell fabric washing machine 140 in a fill cycle, FIG. 32 shows the bipolar cell fabric washing machine 140 in a wash cycle, and FIG. 33 shows the bipolar cell fabric washing machine 140 in a drain cycle. The basic bipolar cell fabric washing machine 140 includes the redox bipolar cell assembly 50, a pump and motor combination 141, along with a tub 146, a basket 147, and an agitator 148, and an agitator drive motor 149. Also included is a wastewater drain 142, and a solenoid operated control valve manifold 143, a tap water inlet for hot water 144, and a tap water inlet for cold water 145. FIG. 31 shows the bipolar cell fabric washing machine 140 in a fill cycle. Similar to the prior art fabric washing machine, the tub 146 is filled with soiled fabrics with the fill cycle then commencing with the tub 146 filling with tap water operating through the solenoid control valve manifold 143 using water from the aforementioned water taps 144 and 145. Note that cold water is usually sufficient for the bipolar cell fabric washing machine 140 thus further adding savings on utility costs by reducing the use of hot water.

At this point, the difference is that the bipolar cell fabric washing machine 140 requires no detergent or other additives in the wash water, as the wash water during the start of the wash cycle as shown in FIG. 32 circulates through the redox bipolar cell assembly 50 utilizing the pump and motor combination 141. Once the tap water passes through the redox bipolar cell assembly 50, the tap water becomes charged wash water that effectively removes contaminants from the soiled fabrics without the use of detergent. During the wash cycle wherein the agitator 148 is oscillating or rotating using the agitator motor 149, the pump and motor combination 141 is continuously circulating the charged wash water through the redox bipolar cell assembly 50 to maintain a selected oxidation-reduction potential level of the charged wash water. This charged water using mixed oxidants is produced by an electrochemical reaction in passing the tap water through an electrically charged semi permeable membrane that is contained within the bipolar cell assembly 50. A major difference in the wash cycle between the prior art and the redox bipolar cell fabric washing machine 140 is the timing of the wash cycle. In the prior art the wash cycle timing is based upon the fabric material type that results in a selected fixed time interval of wash time that usually coincides with a specific wash water temperature. In the redox bipolar cell fabric washing machine 140 the time for the wash cycle is not a relevant issue but measurement of the oxidation-reduction potential of the charged wash water is what determines the length of time for the wash cycle. Thus, the result is that the wash cycle time is completely optimized based upon the size of the soil fabric load and how soiled the fabrics are, such that for a small load of slightly soiled fabrics the wash cycle time will be short and conversely for a large load of highly soiled fabrics the wash time will be longer. This process ensures that the fabrics are washed only until they are clean and no longer, minimizing the physical wear and tear of the fabrics and coincident without detergent both acting to increase fabric life.

The control of the oxidation reduction potential of the charged wash water is accomplished by a oxidation reduction potential sensor 155 that is available from Sensorex, Part No. #5660CD-ORP or an acceptable equivalent. The oxidation-reduction potential sensor 155 measures the charged wash water oxidation-reduction potential in the bipolar cell assembly 50 inlet line. Once the tub 146 is full of tap water and the pump and motor combination 141 starts to circulate the tap water through the bipolar cell assembly 50 the wash water reaches the proper oxidation reduction potential approximately within five minutes depending upon the quantity of soiled fabrics and how soiled the fabrics are.

During the wash cycle once the proper oxidation and reduction potential is reached for the charged wash water there is an additional period of approximately two through five minutes where and the wash cycle will continue to ensure that the fabric contaminants have been removed. The selected setpoint of the oxidation-reduction potential of the charged wash water is optimized for different types of fabrics. For instance, delicate fabrics such as silks and linens may use an oxidation-reduction potential setpoint of approximately 750, while normal colored fabrics, such as colored cottons may use an oxidation-reduction potential set point of approximately 850. Also, white cotton fabrics may use an oxidation-reduction potential of approximately as high as 950. However, an oxidation-reduction potential of approximately 650 is typically enough to ensure that the dirt, soil, and organic contaminants have been removed from the soiled fabrics. Note that an advantage of this process in using charged wash water in the redox bipolar cell fabric washing machine 140 is that bleaches, whiteners, and fabric softeners are not required, and in fact if they were added to the charged wash water, they would be treated as contaminants and fully removed through oxidation.

FIG. 33 shows the drain cycle for the redox bipolar cell fabric washing machine 140. The pump and motor combination 141 removes the charged wash water, which is charged waste wash water at this point from the tub and pumps the charged waste water out at the wastewater outlet 142. An advantage of the charged wastewater is that it contains no phosphates, heavy organics or hazardous metals that would typically be contained in the prior art fabric washing machine wastewater. The charged wastewater is beneficial to the wastewater treatment process in that it will help treat other sources of organics lowering the overall biological oxygen demand and chemical oxygen demand of the wastewater. A rinse cycle is not mandatory, however, a rinse cycle can be used to further remove contaminants from fabrics. The rinse cycle is commenced as in the prior art fabric washing machine in that the tub is filled with tap water and then using the bipolar cell fabric washing machine 140 the pump and motor combination 141 circulates the rinse water through the bipolar cell assembly 50 such that the oxidation reduction potential is controlled to approximately 500 with the rinse cycle typically lasting about five minutes.

Advantages of the redox bipolar cell for a washing machine 140 are numerous, being the reduction of fabric wash time typically reducing the wash cycle time by one half, also since no detergents are used there is no residual detergent and the fabric to irritate the skin of sensitive individuals. Also, the amount of residual contaminants is reduced as the soiled fabrics approximately contain 0.1% of the original contaminants remains by weight on the washed fabric as compared to the prior art that typically leaves in about 2 through 5% of the contaminants by weight remaining in the washed fabric. In addition, water consumption of the redox bipolar cell fabric washing machine 140 in comparison to the prior art fabric washing machine reduces the use of water by approximately one-third.

There are three additional refinements to the redox bipolar cell fabric washing machine as previously described, a first refinement is the addition of air or oxygen inlets for the mixing of air or oxygen with the tap or charged wash water to obtain a higher level of air or oxygen to impinge upon the anode plates in the bipolar cell assembly for an increased oxidation reduction potential output. A second refinement is the addition of a filter between the tub drain and the pump and motor combination inlet, and a third refinement is the addition of an electrocoagulation unit that would be used in conjunction with the filter, with the electrocoagulation unit being located between the tub drain and filter inlet. Both the addition of a filter and an electrocoagulation unit act to further reduce the wash cycle time, the water consumed, and results in an even lower residual contaminant level for the washed fabrics.

On the first enhancement to the bipolar cell assembly's 50 ability to generate oxygen ions, resulting in increased oxidation reduction potential of the charged wash water, an air or oxygen inlet connection 157 near the pump and motor combination 141 pump inlet, which effectively will cause pump cavitation is added. This will cause the entraining of air or oxygen in the charged wash water that enters the bipolar cell assembly 50. The volumetric flow rate of air or oxygen required is approximately two to five liters per minute volumemetric flow rate at standard atmospheric conditions. This allows for a higher oxygen content charged wash water to impinge upon the anodes that are contained within the bipolar cell assembly 50 resulting in an increased oxidation reduction potential for the charged wash water exiting from the bipolar cell assembly 50. This circulation of air bubbles assists the anodes in producing a higher yield of oxygen ions. Additional inlet points for the air or oxygen are at a venturi 159 at the inlet of the bipolar cell assembly and directly at an anode impingement point 160 in the bipolar cell housing.

Figure 34:
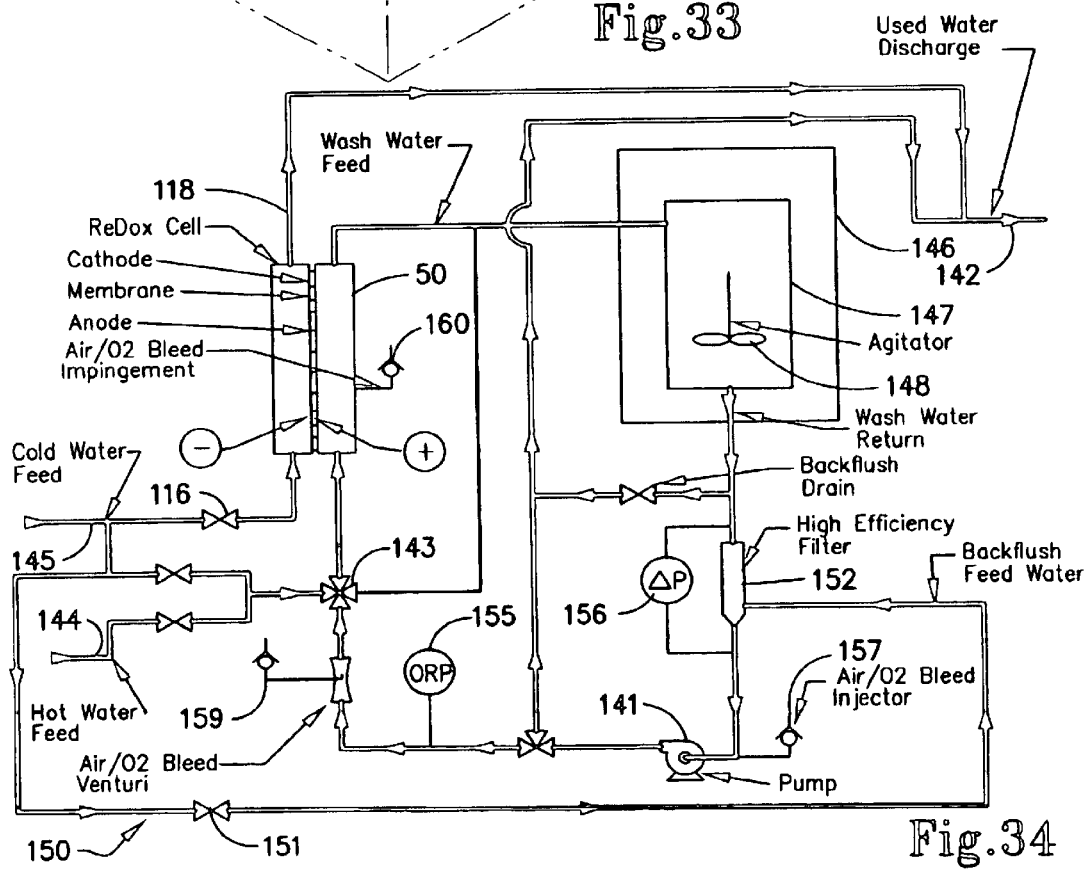
FIG. 34 shows a schematic of a redox bipolar cell fabric washing machine with a filter.
Figure 35:
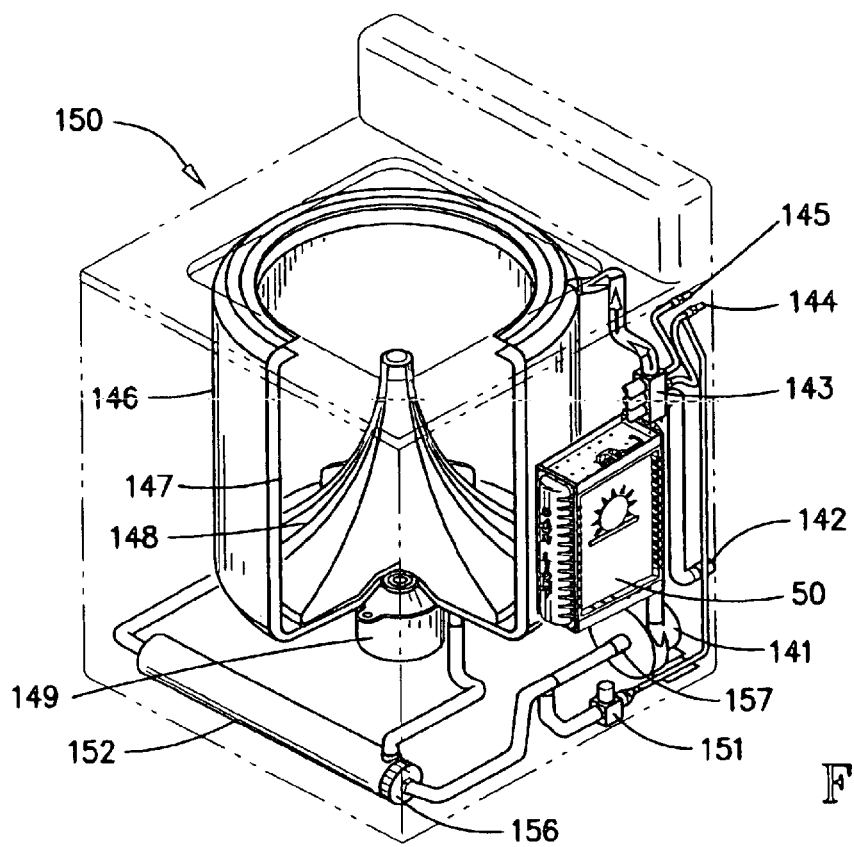
FIG. 35 shows a perspective view of a redox bipolar cell fabric washing machine with a filter in a fill cycle.

FIGS. 34, 35, 36, 37, and 38 show the redox bipolar cell fabric washing machine 150 with the addition of a filter 152. This redox bipolar fabric washing machine with filter 150 functions in and basically the same manner as the basic redox fabric washing machine 140 with the addition of a filter as shown in FIGS. 34, 35, 36, 37, and 38. FIG. 34 shows the schematic of the redox bipolar cell fabric washing machine 150 with the addition of a filter 152. FIG. 35 shows the fill cycle of the redox bipolar cell fabric washing machine with filter 150, as previously described for the basic redox bipolar cell fabric washing machine 140, tap water is utilized from connections 144 and 145 acting through the solenoid control valve manifold 143 to fill the tub 146 that contains soiled fabrics without the addition of detergent. The redox bipolar cell fabric washing machine with filter also utilizes basket 147, agitator 148, and agitator drive motor 149. Also, the pump and motor 141, a charge wastewater outlet 142, and the redox bipolar cell assembly 50 are used. The filter 152 is a self cleaning channel type that utilizes a backflushing system for the filter to clean itself at intervals determined by the differential pressure across the filter, wherein the differential pressure across a filter increases with the amount of contaminants trapped in the filter. This allows for the filter 152 to not require individual maintenance or replacement of any type of filter cartridge and to be a self-contained component not requiring external maintenance. The filter 152 is an absolute filter type and filters out contaminants down to a size of about 0.05 mm. The filter 152 is available from Seo Myoung Company Ltd. (Dawn Light Co.) of Korea, part number #1001-0224050 or any suitable functional equivalent.

Figure 36:
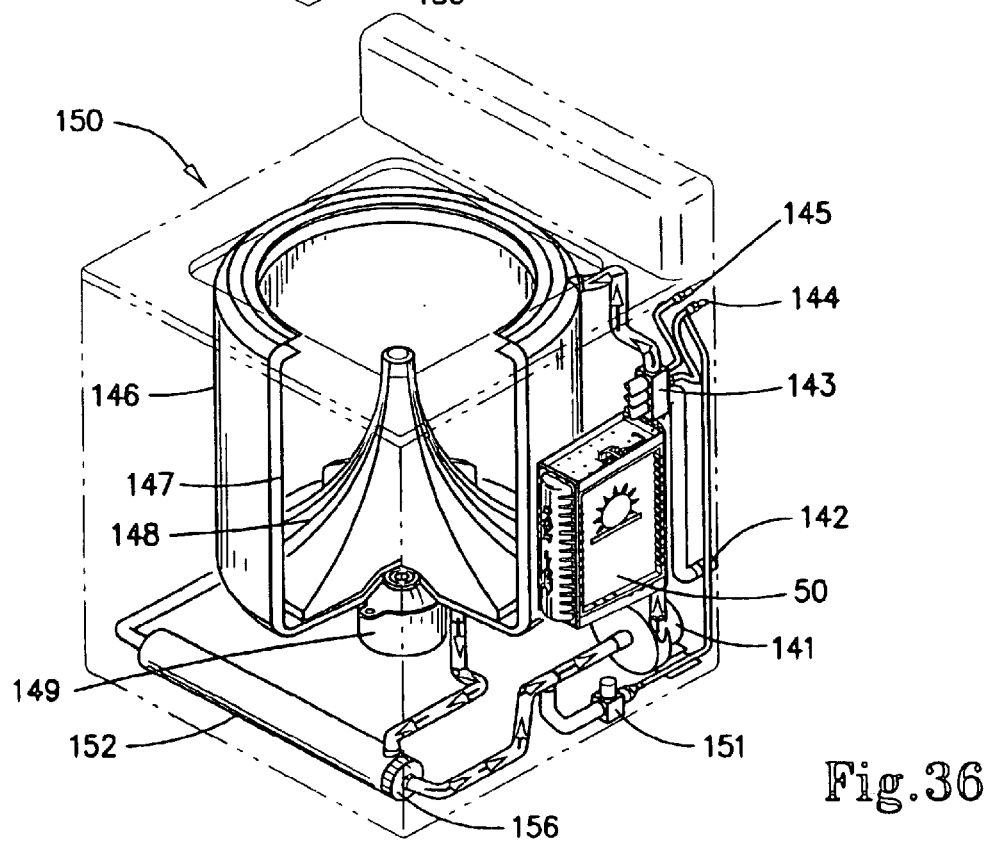
FIG. 36 shows a perspective view of a redox bipolar cell fabric washing machine with a filter in a wash cycle.
Figure 37:
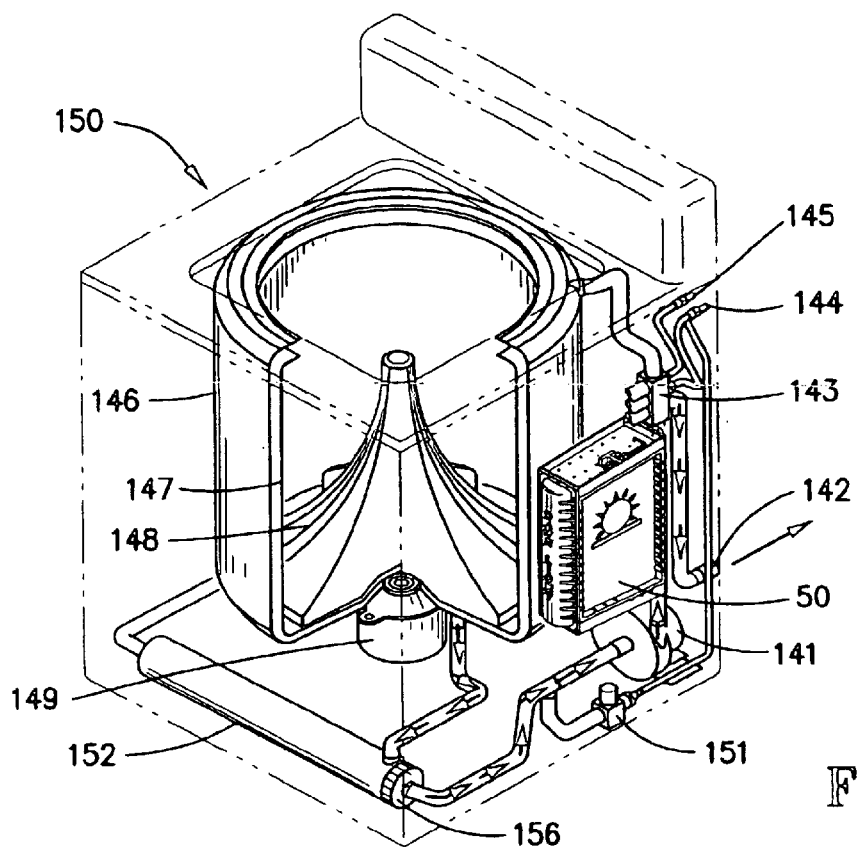
FIG. 37 shows a perspective view of a redox bipolar cell fabric washing machine with a filter in a drain cycle.
Figure 38:
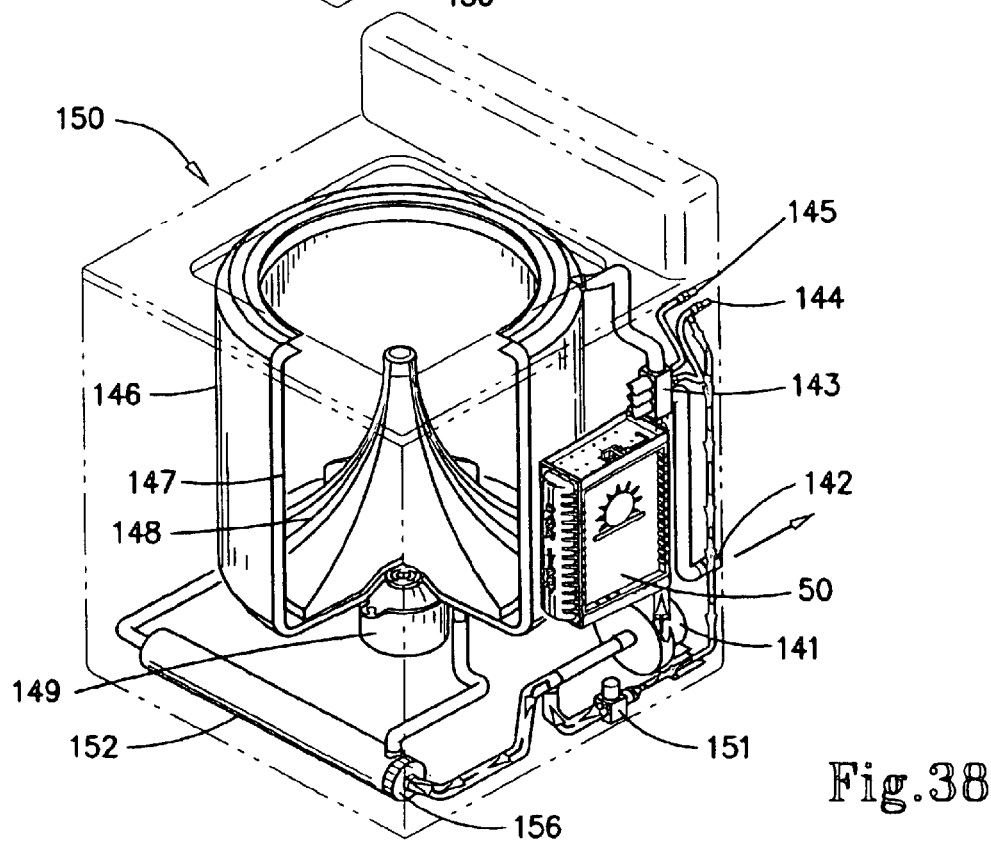
FIG. 38 shows a perspective view of a redox bipolar cell fabric washing machine with a filter in a filter backwash cycle.

FIG. 36 shows the wash cycle of the redox bipolar cell fabric washing machine with filter 150, wherein the pump and motor combination 141 draws the charged recycled wash water from the bottom of the tub 146 through the filter 152 and then continuously circulates the filtered charged wash water through the bipolar cell assembly 50 and returning to the top of the tub 146. The filtered and charged wash water helps to prevent the contaminants that are removed from the soiled fabrics from reattaching to the fabric during the wash cycle. The drain cycle is shown in FIG. 37 again where the charged wastewater is removed from the bottom of the tub 146 going through the filter 152 with the pump and motor combination 141 discharging the filtered charged wastewater at the waste water outlet 142. As was previously mentioned, the filter 152 is cleaned by a backflushing procedure as depicted in FIG. 38. A backflush solenoid valve 151 is utilized to control the flow of the backflush tap water from tap water inlet connection 144. This backflush solenoid valve 151 is of a conventional type used in similar systems. A differential pressure transducer 156 is used to measure the pressure drop of the charged wash water across the filter 152. The differential pressure transducer 156 is available from Honeywell, part number #24PCC or any acceptable functional equivalent. The transducer 156 at a selected a differential pressure setpoint activates the backflush solid solenoid valve 151 and simultaneously puts the redox bipolar cell fabric washing machine with filter 150 in an inoperative state. As FIG. 38 shows the backflush utilizes the tap water from connection 144 flowing through the backflush solenoid valve 151 and flows into the filter in a reverse direction from that normally used in the wash cycle. At this point the tap water contains the contaminants removed from the backflushing of the filter 152 and exits the filter and eventually connects with the wastewater drain 142. The backflush procedure continues for a selected amount of time until substantially all of the contaminants have been removed from the filter 152 at which time the back flush solenoid valve closes, allowing the redox bipolar cell fabric washing machine with filter 150 to return to an operative state. This backflushing procedure optimizes the cleaning intervals of the filter 152 and that the filter is not backflushed to clean until a selected a differential pressure across the filter is sensed by the transducer 156, thus many loads of lightly soiled fabrics could be washed prior to the filter 152 needing the backflush procedure.

Figure 39:
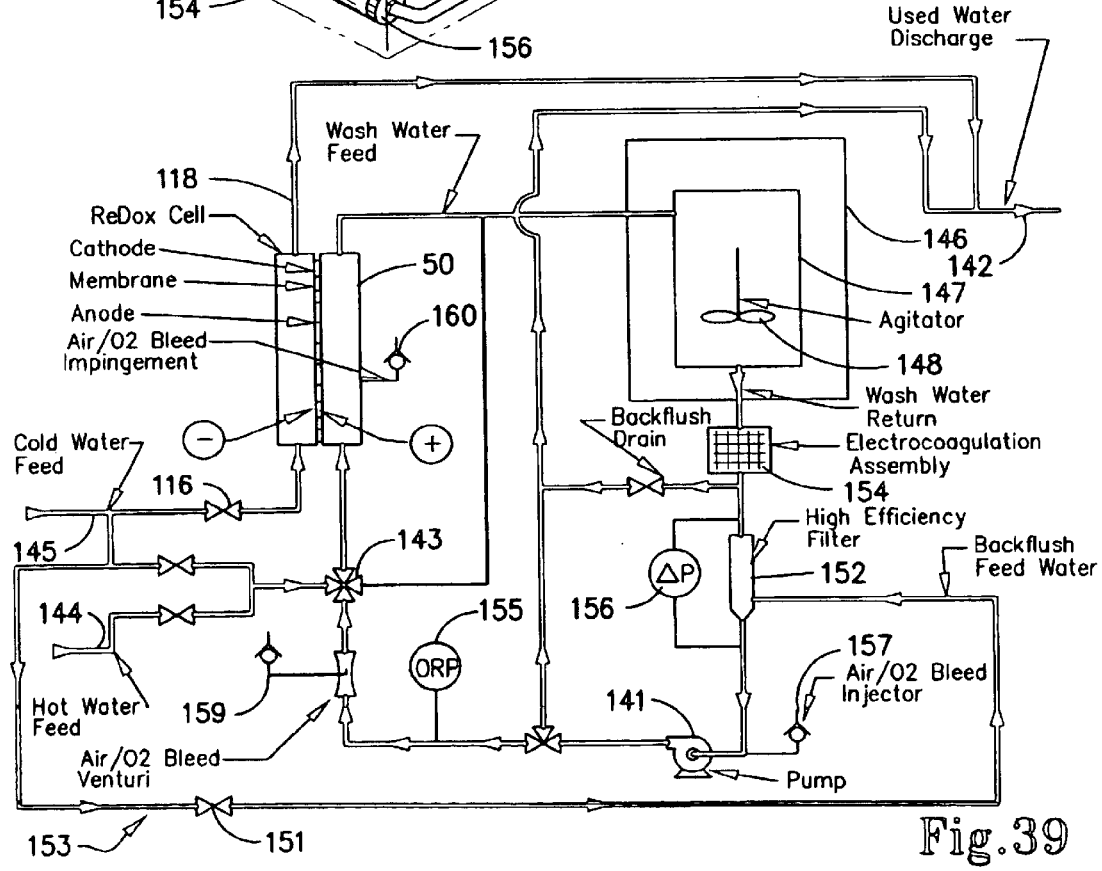
FIG. 39 shows a schematic of a redox bipolar cell fabric washing machine with a filter and an electrocoagulation unit.
Figure 41:
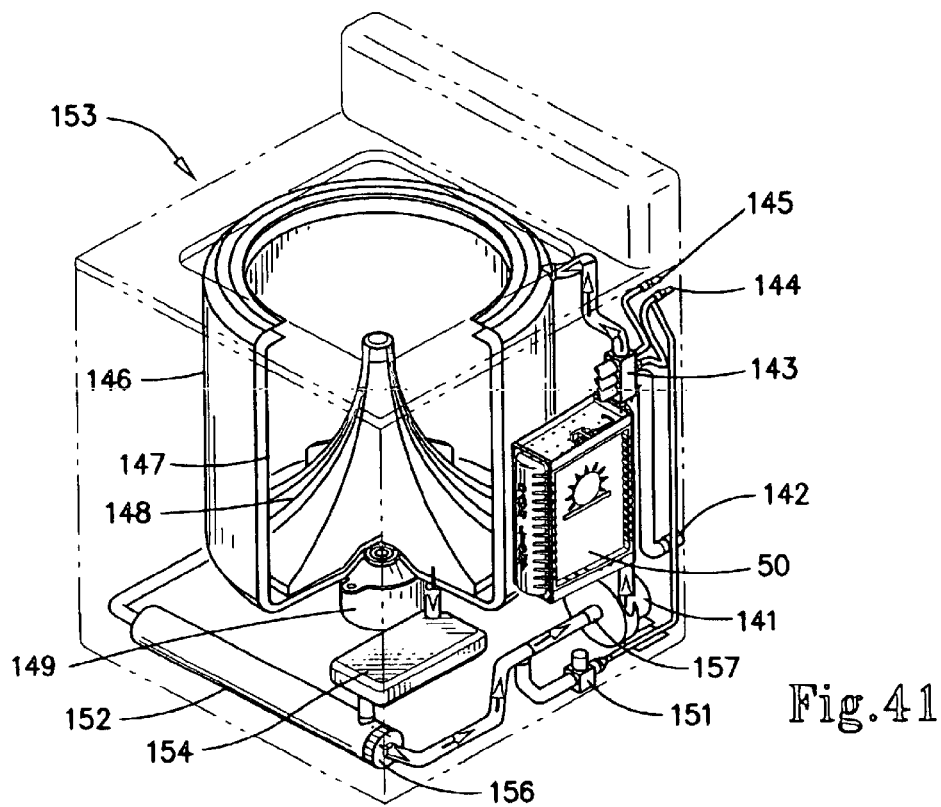
FIG. 41 shows a perspective view of a redox bipolar cell fabric washing machine with a filter and an electrocoagulation unit in a wash cycle.

FIGS. 39, 40, 41, 42, and 43 show the use of the redox bipolar cell fabric washing machine 153 with both a filter 152 and an electrocoagulation unit 154. FIG. 39 is a fluid schematic of the redox bipolar cell fabric-washing machine with both a filter 152 and an electrocoagulation unit 154. FIGS. 40, 41, 42, and 43 are perspective views of the redox bipolar cell fabric washing machine with both a filter 152 and an electrocoagulation unit 154. The electrocoagulation unit 154 is upstream of the filter inlet and acts to clump together small size contaminants thus allowing the filter to do a more efficient job in removing small contaminants that might be able to pass through the filter being smaller than about 0.05 mm in dimension. Electrocoagulation is a process or technique in which the contaminant laden charged wash water passes between a number of conductive plates through which pass an electric current. This electric current disrupts the surface charge of the contaminants and causes them to coagulate or clump together in small groups. Electrocoagulation will remove effectively all suspended solids and organic matter as well as a large percentage of dissolved salts and metals in the charged wash water. Thus, electrocoagulation followed by filtration will clean the charged wastewater to quality that is substantially as good as the tap water initially used to fill the redox bipolar cell fabric washing machine having both a filter 152 and electrocoagulation unit 154. The fabrics cleaned in the bipolar cell fabric washing machine having both a filter and electrocoagulation unit will be substantially free of all contaminants, including dirt, lint, soils, and salts. Thus, the rinse cycle is totally unnecessary resulting in both a wash time savings and water consumed savings. The charged wash water used in conjunction with the filter and the electrocoagulation unit as it is cleaned substantially to the same contaminant levels as the original tap water can be reused to wash subsequent loads of soiled fabrics. This results in the only water consumed being make up water that is removed from the process as the damp fabrics are removed from the washing machine which amounts to about 5 to 10 liters of make up water required per load.

Figure 40:
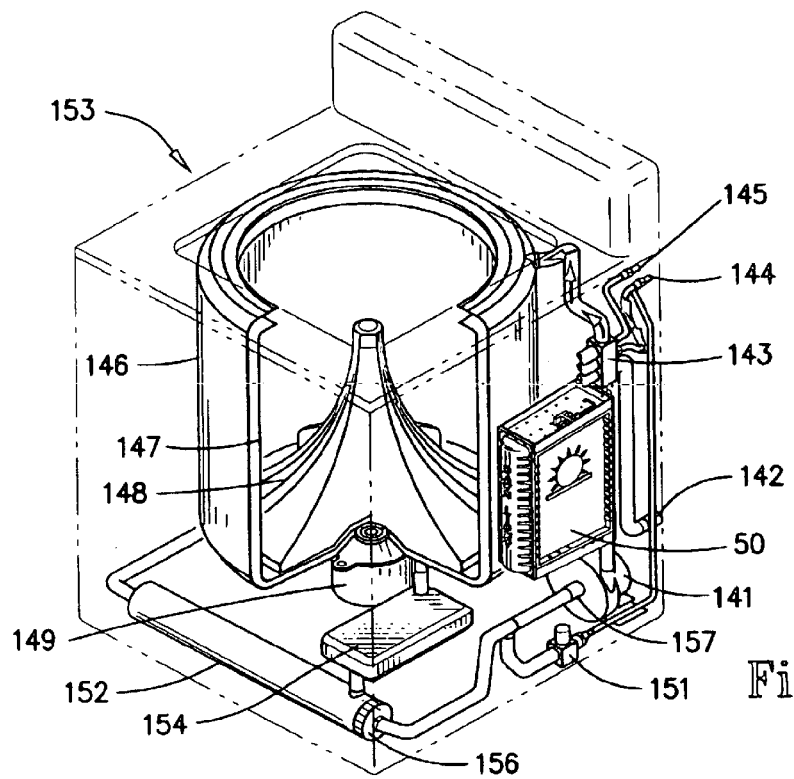
FIG. 40 shows a perspective view of a redox bipolar cell fabric washing machine with a filter and an electrocoagulation unit in a fill cycle.

Starting with FIG. 39, the components of the bipolar cell fabric washing machine with electrocoagulation unit 154 and filter 152 are shown and include the tub 146, the basket 147, the agitator 148, and the agitator drive motor 149. Also included are the filter 152 as previously described and the electrocoagulation unit 154. The electrocoagulation unit 154 is available from Seo Myoung Company Ltd. (Dawn Light Co.) of Korea, part number #1101-081220 or any acceptable functional equivalent. The electrocoagulation unit 154 is positioned in the flow line between the tub 146 bottom drain and the filter 152 inlet, thus the electrocoagulation process occurs on the charged wash water prior to filtration. Additionally, backflush solenoid valve 151, the pump and motor combination 141, the waste water drain 142, the bipolar cell assembly 50, the solenoid operated control of valve manifold 143, along with the tap water connections 144 and 145 are included in the bipolar cell fabric washing machine with filter and electrocoagulation unit 153. FIG. 40 shows the bipolar cell fabric washing machine with filter and electrocoagulation unit 153 in a fill cycle, wherein the solenoid operated control valve manifold 143 utilizes tap water from connections 144 and 145 to fill the tub 146. Moving to FIG. 41 the wash cycle is shown for the bipolar cell fabric washing machine with filter and electrocoagulation unit 153. The pump and motor combination 141 continuously circulates the charged wash water through the bipolar cell assembly 50 and into the top of the tub 146, wherein the charged wash water picks up contaminants that go into the tub 146 drain and on into the electrocoagulation unit 154. The electrocoagulation unit 154 works on a continuous basis during the wash cycle. Subsequently, the charged wash water exiting the electrocoagulation unit enters the filter 152 inlet wherein the clumped contaminants are filtered out of the charged wash water that returns to the pump and motor combination inlet 141 to continue the process until the oxidation reduction potential sensor selected setpoint is satisfied as previously described.

Figure 42:
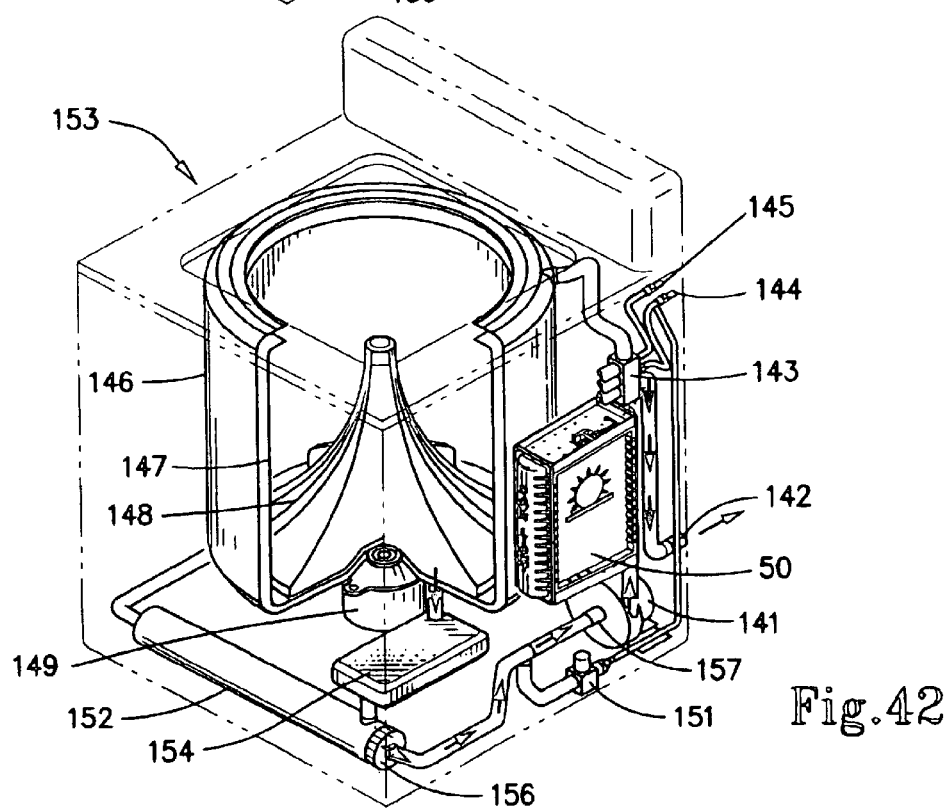
FIG. 42 shows a perspective view of a redox bipolar cell fabric washing machine with a filter and an electrocoagulation unit in a drain cycle.
Figure 43:
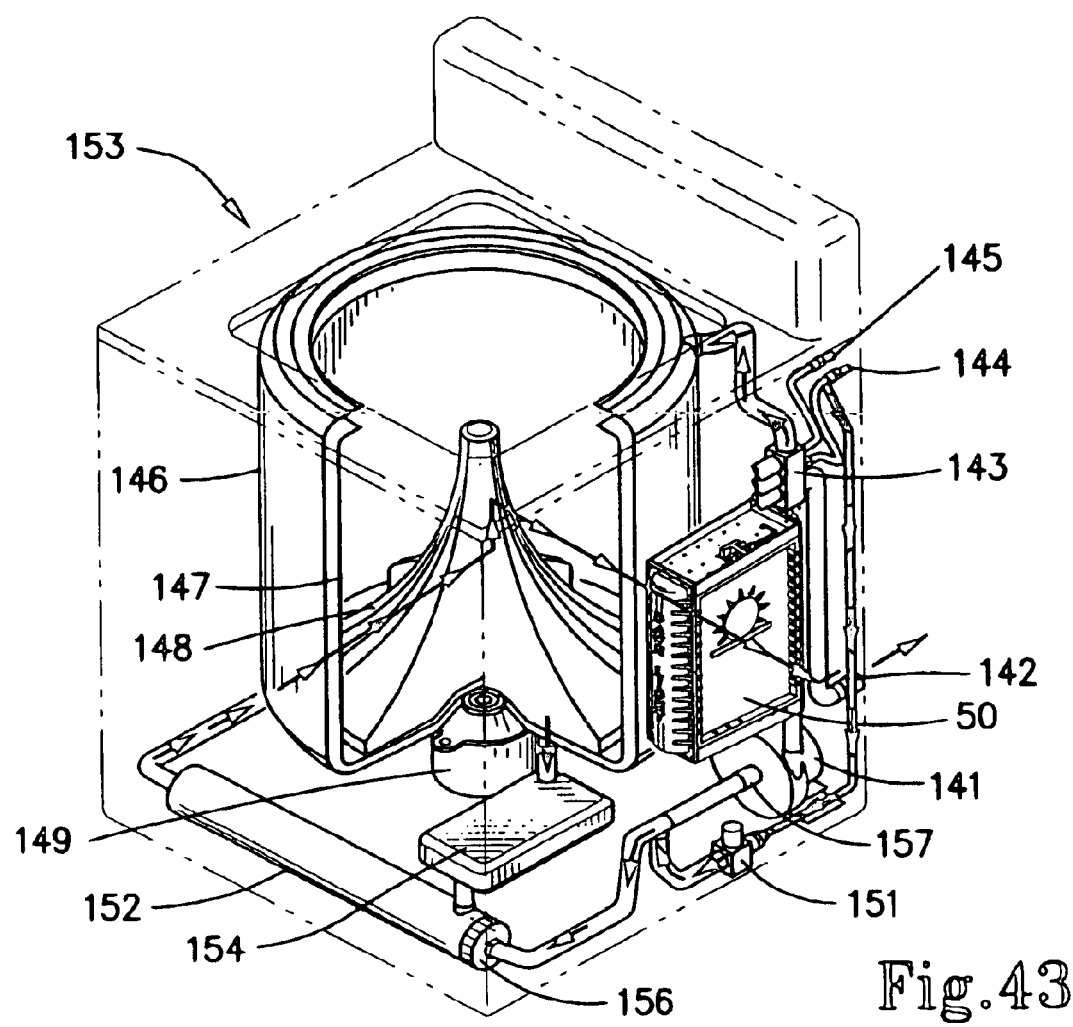
FIG. 43 shows a perspective view of a redox bipolar cell fabric washing machine with a filter and an electrocoagulation unit in a filter backflush cycle.

Moving to FIG. 42 a drain cycle is shown for the bipolar cell fabric washing machine with a filter and electrocoagulation unit 153. The pump motor combination 141 draws the charged wash water from the bottom of the tub 146 through the electrocoagulation unit 154, and subsequently into the filter 152 inlet and discharges the charged wastewater out of the wastewater outlet 142. Finally, to FIG. 43 the filter 152 backflush cycle is shown, that uses the differential pressure transducer 156 that operates at a selected set point of differential pressure across the filter 152, to activate the backflush solenoid valve 151. At this point tap water flows in a reverse manner through the filter 152 to remove the trapped contaminants that are then driven out to the wastewater outlet 142.

Conclusion

Accordingly, the present invention of a redox bipolar cell fabric washer system assembly has been described with some degree of particularity directed to the embodiments and use of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A redox bipolar cell in a fabric washing machine utilizing tap water with a low oxidation reduction potential and producing charged wash water by an electrochemical reaction to elevate the oxidation reduction potential of the wash water to remove contaminants from soiled fabrics forming charged waste water, without the use of a detergent, comprising:

(a) a housing, including an inlet aperture for the tap water or the charged recycled wash water, an outlet aperture for the charged wash water, an inlet opening for the tap water to form an electrolyte, an outlet opening for a hydrogen rich electrolyte and a plurality of electrical connections;

(b) a plurality of cathode plates, ion exchange membranes, and anode plates all disposed within said housing, said cathode and anode plates being separated by said membranes; and (c) a cathode spacer plate positioned between said cathode plates disposed within said housing, said cathode spacer plate forming an electrolyte chamber between said cathode plates, said cathode spacer plate positioned within said housing to facilitate the tap water or the charged waste water to flow over said anode plates.

2. A bipolar cell according to claim 1 wherein said housing has a plurality of flow channels between said inlet aperture and said outlet aperture to increase the velocity of the tap water or the charged water flow across said anode plates.

3. A bipolar cell according to claim 1 wherein said housing is constructed of materials selected from the group consisting of polyethylene, polypropylene, and polyurethane materials.

4. A bipolar cell according to claim 1 wherein said cathode spacer plate is constructed of materials selected from the group consisting of polyethylene, polypropylene, and polyurethane materials.

5. A bipolar cell according to claim 1 wherein said cathode is constructed of a three hundred (300) series stainless steel.

6. A bipolar cell according to claim 1 wherein said membrane is constructed of materials selected from the group consisting of fluorinated polymers and perflurosulfonic acid polymers.

7. A bipolar cell according to claim 1 wherein said anode is constructed of materials selected from the group consisting of 303 stainless steel, 304 stainless steel, 310 stainless steel, and 316 stainless steel.

8. A bipolar cell according to claim 1 wherein said anode is constructed of materials selected from the group consisting of 35A titanium, 50A titanium, 65A titanium, and 75A titanium.

9. A bipolar cell according to claim 1 further including a means for introducing atmospheric air or oxygen into said inlet aperture for the atmospheric air or oxygen to impinge upon said anode plates.

10. A bipolar cell according to claim 1 further including an oxidation reduction potential sensor that measures the charged waste water near said inlet aperture for a selected oxidation reduction potential setpoint, said sensor is in electrical communication with said redox bipolar cell to control the charged wash water output oxidation reduction potential by varying the cathode and anode electrical power between six (6) and twelve (12) volts and zero (0) to ten (10) amperes direct current.

11. A bipolar cell according to claim 10 wherein said oxidation reduction potential sensor utilizes a first oxidation reduction potential setpoint range for delicate fabrics selected from the group consisting of silks, linens, and wools, a second oxidation reduction potential setpoint range for colored fabrics selected from the group consisting of cottons, rayons, nylon, and polyester, and a third oxidation reduction potential setpoint range for white cotton fabrics.

12. A bipolar cell according to claim 10 wherein said oxidation reduction potential sensor utilizes a selected oxidation reduction potential setpoint range for a charged rinse water for a rinse cycle of the fabric washing machine.

13. A bipolar cell according to claim 1 further including a filter that removes contaminates from the charged waste water near said inlet aperture to reduce the possibility of the contaminants reattaching to the fabric resulting in lower residual fabric contaminant levels.

14. A bipolar cell according to claim 13 further including a differential pressure sensor positioned to measure said filter differential pressure, said differential pressure sensor is in electrical communication with a means for backflushing filter trapped contaminants from said filter, said differential pressure sensor is operative to activate said means for backflushing at a selected differential pressure setpoint range.

15. A bipolar cell according to claim 13 further including an electrocoagulation unit positioned upstream of said filter, said electrocoagulation unit is operative to coagulate or clump together the charged waste water contaminants allowing said filter to remove groups of smaller contaminants resulting in the lowest residual fabric contaminant levels.

16. A method of using a redox bipolar cell in a fabric washing machine utilizing tap water with a low oxidation reduction potential and producing charged wash water by an electrochemical reaction to elevate the oxidation reduction potential of the wash water to remove contaminants from soiled fabrics forming charged waste water, without the use of a detergent, comprising the steps of:

(a) providing the fabric washing machine with said redox bipolar cell;
      said cell comprising (1) a housing, including an inlet aperture for the tap water or the charged recycled wash water, an outlet aperture for the charged wash water, an inlet opening for the tap water to form an electrolyte, an outlet opening for a hydrogen rich electrolyte and a plurality of electrical connections;
      (2) a plurality of cathode plates, ion exchange membranes, and anode plates all disposed within said housing, said cathode and anode plates being separated by said membranes; and
      (3) a cathode spacer plate positioned between said cathode plates disposed within said housing, said cathode spacer plate forming an electrolyte chamber between said cathode plates, said cathode spacer plate positioned within said housing to facilitate the tap water or the charged waste water to flow over said anode plates;

(b) providing required utilities of, an electrical power supply, a charged wastewater drain, and a tap water supply;

(c) providing the contaminated fabrics;

(d) placing the contaminated fabrics in a washtub of the fabric washing machine;

(e) filling the washtub with the charged wash water from said redox bipolar cell connected to the tap water supply;

(f) starting a wash cycle in the fabric washing machine to continue for a selected period; and (g) draining the washtub into the charged wastewater drain.

17. A method of using a redox bipolar cell in a fabric washing machine according to claim 16 further including the step of monitoring the oxidation reduction potential of the charged wash water during said wash cycle to control the oxidation reduction potential of the charged wash water by varying said redox bipolar cell voltage and current from the electrical power supply, the oxidation reduction potential range based on a selected fabric type.

18. A method of using a redox bipolar cell in a fabric washing machine according to claim 16 further including the step of starting a rinse and drain cycle to continue for a selected period after said step of draining to lower the residual contaminants in the contaminated fabrics.

19. A method of using a redox bipolar cell in a fabric washing machine according to claim 18 further including the step of monitoring the oxidation reduction potential of a charged rinse water during said rinse cycle to control the oxidation reduction potential of the charged rinse water by varying said redox bipolar cell voltage and current from the electrical power supply, the oxidation reduction potential range based on a selected setpoint.

20. A method of using a redox bipolar cell in a fabric washing machine according to claim 16 further including the step of filtering with a filter the charged wash water to reduce the possibility of the contaminants reattaching to the fabric resulting in a lower residual fabric contaminant level.

21. A method of using a redox bipolar cell in a fabric washing machine according to claim 20 further including the step of monitoring a differential pressure of said filter to activate a means for backflushing said filter to remove filter contaminants at a selected differential pressure setpoint range.

22. A method of using a redox bipolar cell in a fabric washing machine according to claim 20 further including the step of electrocoagulating the charged wash water prior to said filtering step to coagulate or clump together the charged wash water contaminants allowing said filtering step to remove groups of smaller contaminants resulting in a lowest residual fabric contaminant level.

23. A method of using a redox bipolar cell in a fabric washing machine according to claim 16 further including the step of introducing an amount of atmospheric air or oxygen into the charged wash water to further elevate the oxidation reduction potential of the charged wash water.

* * * * *

UNITED STATES PATENT AND TRADEMARK OFFICE
CERTIFICATE OF CORRECTION

PATENT NO.   : 6,841,058 B2
DATED        : January 11, 2005
INVENTOR(S)  : Brian G. Culvey and Kim Bong Jun It is certified that error appears in the above-identified patent and that said Letters Patent is hereby corrected as shown below:

<u>Title page,</u>
Item [75], Inventors, change "Kim Bong Jun" to -- Bong Jun Kim --.

Signed and Sealed this

Thirtieth Day of August, 2005

JON W. DUDAS
*Director of the United States Patent and Trademark Office*